US008078513B1

(12) United States Patent
Sobh et al.

(10) Patent No.: US 8,078,513 B1
(45) Date of Patent: Dec. 13, 2011

(54) NORMALIZED DISTRIBUTED EXCHANGE SYSTEM

(75) Inventors: Tarek M. Sobh, Shelton, CT (US); Tarek Khaled Alameldin, Fresno, CA (US); Naglaa K. Alameldin, legal representative, Fresno, CA (US); Raul Constantin Mihali, Milford, CT (US); Andrei Rosca, Stamford, CT (US)

(73) Assignee: Automated Exchange Systems, Inc., Shelton, CT (US)

( * ) Notice: Subject to any disclaimer, the term of this patent is extended or adjusted under 35 U.S.C. 154(b) by 597 days.

(21) Appl. No.: 11/778,606

(22) Filed: Jul. 16, 2007

(51) Int. Cl.
*G06Q 40/00* (2006.01)
(52) U.S. Cl. ........... 705/35; 705/37; 705/39; 705/41; 705/44
(58) Field of Classification Search ........... 705/35–45
See application file for complete search history.

(56) References Cited

U.S. PATENT DOCUMENTS

| 6,035,287 | A | 3/2000 | Stallaert et al. | |
|---|---|---|---|---|
| 6,058,379 | A | 5/2000 | Odom et al. | |
| 6,449,601 | B1 | 9/2002 | Friedland et al. | |
| 6,629,083 | B1 | 9/2003 | Morton | |
| 6,847,938 | B1 * | 1/2005 | Moore | 705/26 |
| 2002/0004759 | A1 | 1/2002 | Bradford et al. | |
| 2002/0010636 | A1 | 1/2002 | Immel | |
| 2002/0059132 | A1 | 5/2002 | Quay et al. | |
| 2002/0059134 | A1 | 5/2002 | Ebbs et al. | |
| 2002/0065787 | A1 * | 5/2002 | Evers et al. | 705/80 |
| 2002/0072978 | A1 | 6/2002 | Odom et al. | |
| 2002/0073015 | A1 | 6/2002 | Chan et al. | |
| 2002/0107783 | A1 | 8/2002 | La Mura et al. | |
| 2002/0120554 | A1 | 8/2002 | Vega | |
| 2002/0120555 | A1 | 8/2002 | Lerner | |
| 2002/0147640 | A1 | 10/2002 | Daniele et al. | |
| 2002/0165792 | A1 | 11/2002 | Morrell, Jr. | |
| 2002/0165817 | A1 | 11/2002 | Rackson et al. | |
| 2002/0188527 | A1 | 12/2002 | Dillard et al. | |

(Continued)

FOREIGN PATENT DOCUMENTS

JP 2001319102 11/2001

(Continued)

OTHER PUBLICATIONS

"Barter System Starts to Flourish in Kuwait", Kuwait Times, date Dec. 9, 2003.*

(Continued)

*Primary Examiner* — Ella Colbert
*Assistant Examiner* — Hai Tran
(74) *Attorney, Agent, or Firm* — The Eclipse Group LLP

(57) ABSTRACT

A real-time normalized, distributed exchange and barter system that allows multiple members to exchange multiple goods and services with other members of the system over a distributed network such as the Internet. The system may develop a plurality of permutations of trading cycles that allow for indirect exchanges between its members, with the option of using cash as an exchange element. The system may also develop permutations of trading cycles for sub-classes and sub-categories of the goods, services and exchange elements within the system, and choose an optimized set of trading cycles among the many trading-cycle permutations that cover the exchange system, based on criteria defined by the system's sponsor. The system may determine all possible cyclic permutations of exchanges between its members and select the cyclic permutation that best meets the defined criteria, also the system would be able to make suggestions or impersonate a user in order to close any open chains.

36 Claims, 23 Drawing Sheets

U.S. PATENT DOCUMENTS

| | | | |
|---|---|---|---|
| 2003/0014351 | A1 | 1/2003 | Neff et al. |
| 2003/0023498 | A1 | 1/2003 | Benton |
| 2003/0088497 | A1 | 5/2003 | Belgrano |
| 2003/0139996 | A1 | 7/2003 | D'Antoni et al. |
| 2003/0154160 | A1* | 8/2003 | Arndt .............................. 705/37 |
| 2004/0019556 | A1 | 1/2004 | Morton |
| 2004/0059596 | A1 | 3/2004 | Vaidyanathan et al. |
| 2004/0107158 | A1 | 6/2004 | Odom et al. |
| 2005/0125308 | A1 | 6/2005 | Puentes et al. |
| 2005/0131797 | A1 | 6/2005 | Ananthanarayanan et al. |
| 2008/0147479 | A1* | 6/2008 | Johnson .......................... 705/10 |

FOREIGN PATENT DOCUMENTS

| | | |
|---|---|---|
| JP | 2001357233 | 12/2001 |
| JP | 2002133272 | 5/2002 |
| JP | 2002150029 | 5/2002 |
| JP | 2002157529 | 5/2002 |
| JP | 2002269385 | 9/2002 |
| JP | 2002297977 | 10/2002 |
| JP | 2002318936 | 10/2002 |
| JP | 2003016229 | 1/2003 |
| JP | 2003076881 | 3/2003 |
| WO | WO 96/21192 | 7/1996 |
| WO | WO 03/007109 | 1/2003 |
| WO | WO 2004/027660 | 4/2004 |

OTHER PUBLICATIONS

EURESCOM, Svein Tore Johnsen et al., *E-commerce impacts on service and network operations and management* (40 pages), Dec. 2001, Heidelberg, Germany.

Mech. Eng. Publications for IMechE, N. Anderson et al., *A distributed e-commerce system for virtual product development teams* (1 page), 2002, U.K.

IEEE Computer Society, S. Hamilton, *E-commerce for the 21st century* (1 page), May 1997, Washington, D.C.

Lawrence Erlbaum Associates, C. Özturan, *Network flow models for electronic barter exchanges* (1 page), 2004, U.S.A.

IEEE Engineering Management Society, D. Keever et al., *Development and growth of Internet environmental exchange services* (1 page), 2000, Piscataway, N.J.

Dennis Publishing, C. Couldwell, *Trading places* (1 page), Aug. 1996, U.K.

IEEE Computer Society, K. Saito, *Maintaining Trust in Peer-to-Peer Barter Relationships* (7 pages), Feb. 2004, U.S.A.

Onecer Exchange, *Online Trading—Trade Exchange Market Place* (17 pages), Melbourne, Australia.

www.jewishworldreview.com, K. Oahn Ha, *Barter becoming crucial to more businesses* (4 pages), Sep. 22, 2003, U.S.A.

Springer-Verlag, M. Jakobsson, *Ripping coins for a fair exchange* (1 page), 1995, Berlin, Germany.

Springer-Verlag, C. Özturan, *Computational Issues in E-commerce Trading Exchanges* (1 page), 2001, London, U.K.

Academic Press Inc. Elsevier Science, R. W. Helsey et al., *Knowledge barter in cities* (1 page), Sep. 2004, San Diego, California.

Academic Press Inc., M. Engineer et al., *Bargains, barter, and money* (1 page), Jan. 2001, San Diego, California.

Home Office Computing, R. Resnick, *Barter for anyone—small businesses use of bartering* (3 pages), Nov. 1992, U.S.A.

Business Wire, *ExchangeAnything.com Debuts Online Barter, Exchange and Donation Technology for Business and Consumer Community; Portal Sites* (3 pages), Apr. 4, 2000, New York, N.Y.

Nation's Business, M. Bertrand, *Let's make a deal—barter deals* (4 pages), Feb. 1995, Washington, D.C.

CNY Business Journal, P. Allen, *Business of Bartering in CNY: Let's Make a Deal!* (3 pages), Sep. 1, 2000, Syracuse, N.Y.

Market Wire, *BigVine.com Selects Quintus eContact To Power Online Barter Site* (2 pages), Mar. 2000, Los Angeles, California.

Business Wire, *ecommUSA Announces Free Trial Membership in Global Trading Network; Online Trading Tools, Services Give Any Business Access to Worldwide Markets* (3 pages), Jan. 16, 2001, New York, N.Y.

IEEE Computer Society, P. Haddawy et al., *Data-Driven Agent-Based Simulation of Commercial Barter Trade* (7 pages), May 1997, Washington, D.C.

University of St. Gallen, H. Axelsson et al., *The B2B Landscape in the Industry of Consumer Packaged Goods* (15 pages), 2001, St. Gallen, Switzerland.

Elsevier Science, Inc., W. Dou et al., *A structural analysis of business-to-business digital markets* (12 pages), Feb. 2002.

* cited by examiner

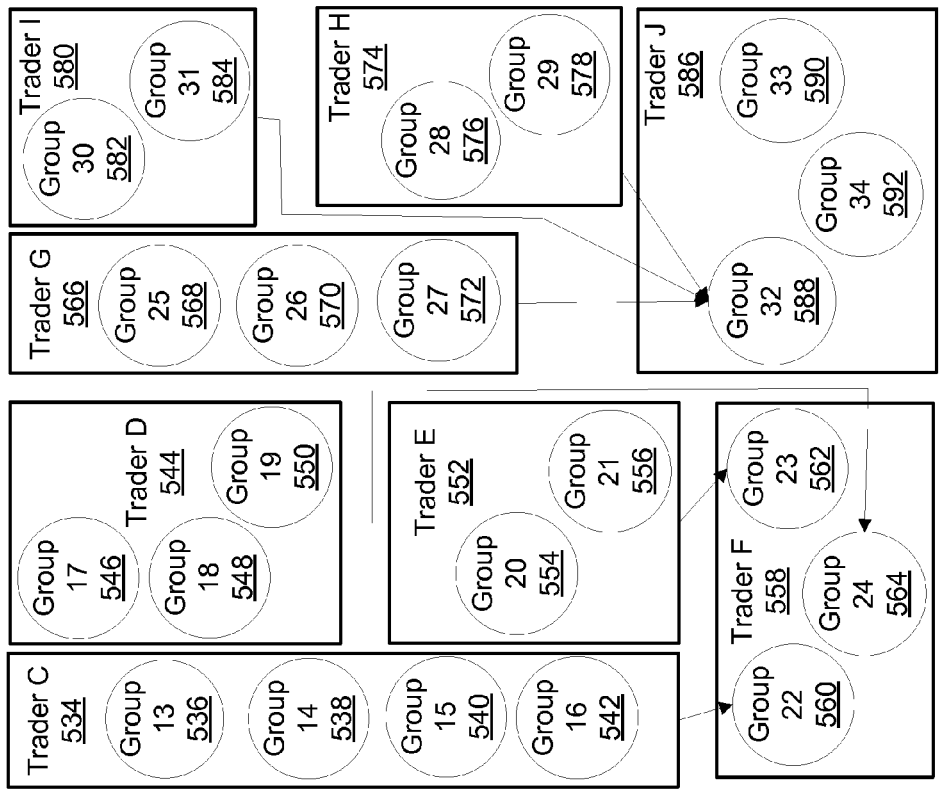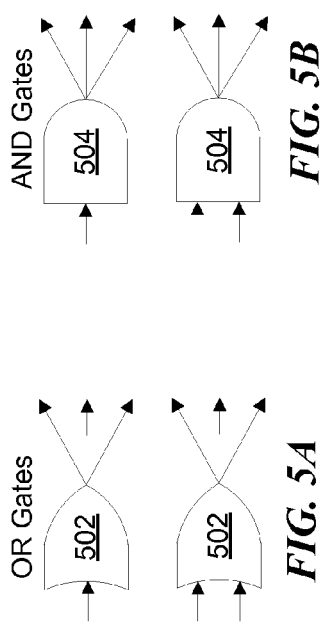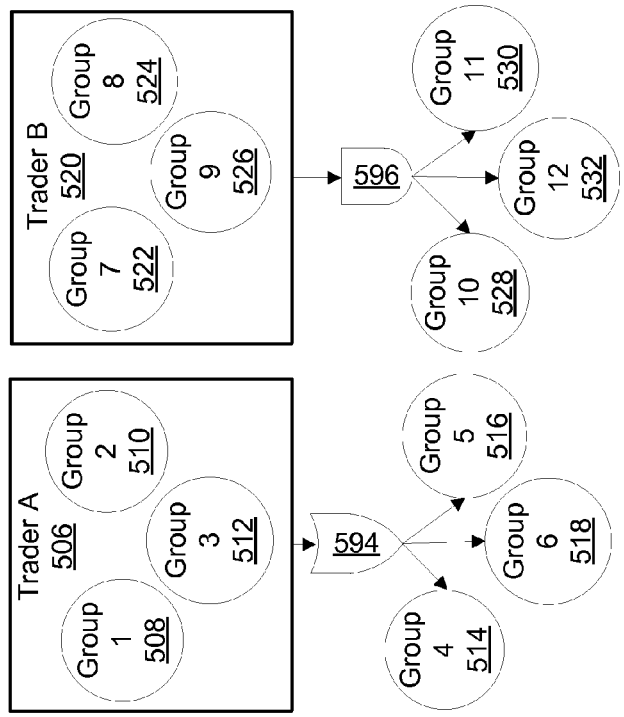
*FIG. 5A* *FIG. 5B* *FIG. 5C* *FIG. 5D* *FIG. 5E* *FIG. 5F*

| Name | Has 1 | Has 2 | Has 3 | Wants 1 | Wants 2 | Wants 3 |
|---|---|---|---|---|---|---|
| Trader 1 | Plasma TV | | | Blue Bicycle | Scanner | Football |
| Trader 2 | Scanner | | | Digital Camcorder | | |
| Trader 3 | Digital Camcorder | DV Tape | | Laptop | | |
| Trader 4 | Laptop | $50.00 | | Projector | "Titanic" DVD | |
| Trader 5 | Projector | Digital Camera | Book | Plasma TV | | |
| Trader 6 | Blue Bicycle | | | Red Bycicle | | |
| Trader 7 | Red bicycle | | | Scooter | | |
| Trader 8 | Scooter | | | Tricycle | $50.00 | |
| Trader 9 | Tricycle | | | Digital Camera | | |
| Trader 10 | Football | | | Hand Bag | | |
| Trader 11 | Hand Bag | | | Sweater | | |
| Trader 12 | Sweater | | | Tripod | | |
| Trader 13 | Tripod | | | Book | | |
| Trader 14 | "Titanic" DVD | | | DV Tape | | |

*FIG. 14B*

| Trader A | | Trader B | | Trader C | | Trader D | | Trader E | | Trader F | |
|---|---|---|---|---|---|---|---|---|---|---|---|
| Has | Wants | Has | Wants | Has | Wants | Has | Wants | Has | Wants | Has | Wants |
| 1 | 15 & 18 | 7 | 4 & 5 & 13 & 20 | 11 | 9 & 10 & 1 | 15 | 3 & 20 & 25 | 20 | 9 & 10 & 13 & 14 | 25 | 6 & 19 |
| 2 | 20 | 8 | 21 & 24 | 12 | 9 & 10 & 2 & 5 | 16 | 4 & 20 & 25 | 21 | 9 & 10 & 14 & 25 | 26 | Suggest 15 & 16 & 17 & 18 & 19 |
| 3 | 12 & 13 | 9 | Suggest 3 | | 1 & Suggest 28 | 17 | 20 & 21 & 23 & 25 & 26 | 22 | Suggest 11 | 27 | 6 & 19 & Suggest 15 & 16 & 17 & 18 |
| 4 | | 10 | | | 2 & 5 & Suggest 28 | 18 | 14 & 20 & 21 & 23 & 25 | 23 | | | |
| 5 | 7 | | | 13 | 16 & 17 & 22 | 19 | Suggest 2 | 24 | | | |
| 6 | 8 & 11 | | | 14 | 24 | | | | | | |
| | | | | | 26 & 27 | | | | | | |

*FIG. 16B*

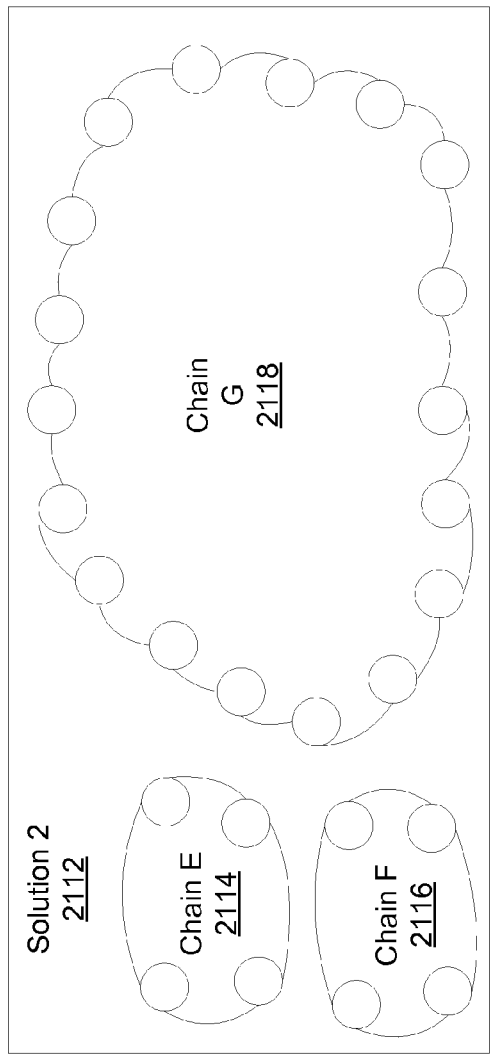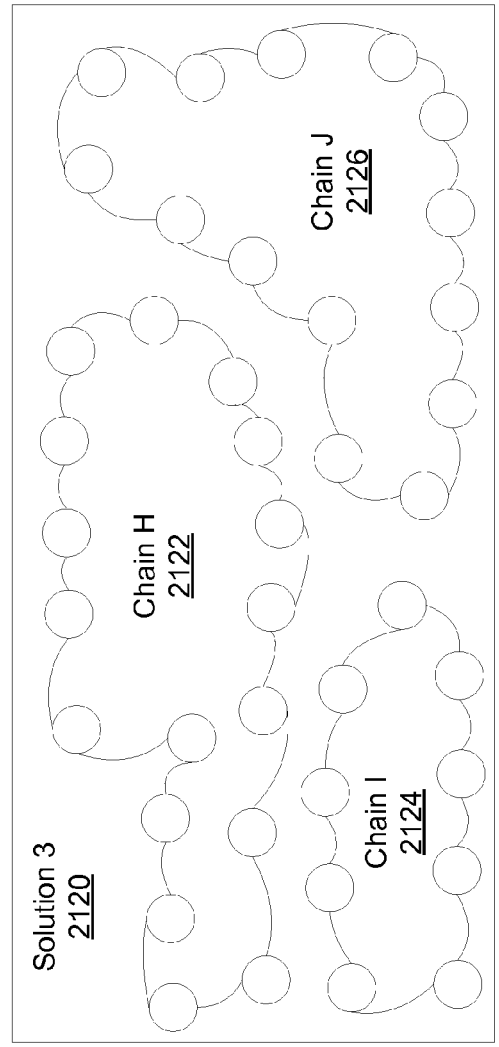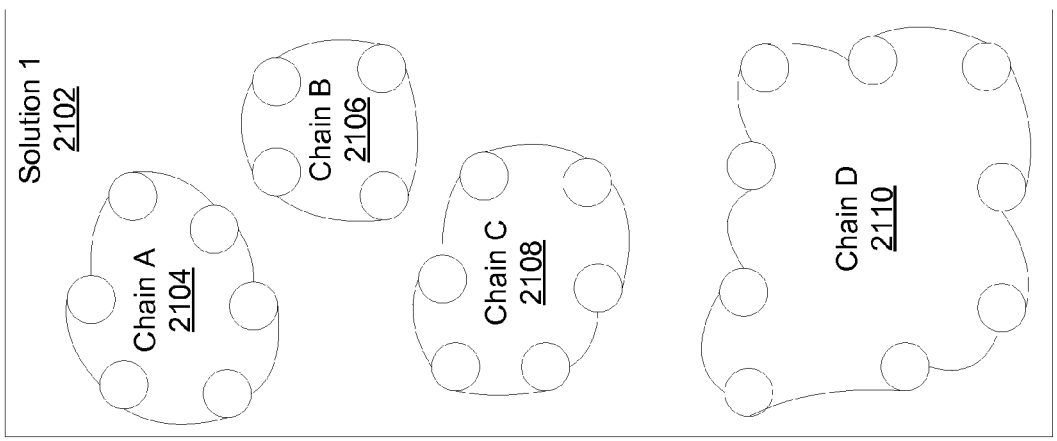
FIG. 21

NORMALIZED DISTRIBUTED EXCHANGE SYSTEM

BACKGROUND OF THE INVENTION

1. Field of the Invention

This invention relates generally to commercial trading systems operating over a network. In particular, this invention relates to a network trading system capable of implementing the exchange of multiple goods and services between multiple users of the trading system.

2. Related Art

As the global computer network known as the "Internet" continues to grow globally at a rapid pace, an increasing number of people and businesses from around the world are accessing the Internet to communicate with each other and conduct various commercial transactions. The concept of E-Commerce first came about in the early 1970's with the development of E-Commerce applications such as Electronic Funds Transfer ("EFT"), which allows funds to be sent electronically from one organization to another. Next came Electronic Data Interchange ("EDI"), which allows the electronic transfer of routine business documents. Many other E-Commerce applications such as stock trading and travel reservation systems evolved out of EDI until finally the commercialization of the Internet brought about the introduction of E-Commerce.

E-Commerce may be defined as any business activity conducted using electronic data transmission technologies, such as those of the Internet and the World Wide Web ("WWW"). E-Commerce involves buying, selling, transferring, or exchanging products, services and/or information via computer networks and is a major distribution channel for the purchase and exchange of goods and services, as well as the posting of various managerial and professional jobs. E-Commerce may be defined from many perspectives, some of which may be: Communications—the delivery of goods, services, information, or payments over computer networks or by any other electronic means; Commercial—the capability of buying and selling products, services and information on the Internet and via other online services; Business Process—doing business electronically by completing business processes over electronic networks; and Service—addressing the desire of firms, consumers, and management to cut service costs while improving the quality of customer service and increasing the speed of service delivery.

The conducting of business electronically may be subdivided into four major categories of E-Commerce: business-to-consumer ("B2C"), business-to-business ("B2B"), consumer-to-consumer ("C2C," which may also be referred to as "peer-to-peer"), and consumer-to-business ("C2B"). Business-to-consumer involves online transactions being made between businesses and individual consumers such as the selling of products and services. Business-to-business involves businesses making online transactions with other businesses. Consumer-to-consumer or peer-to-peer may be characterized by exchanges that involve transactions between and among consumers, with the most well-known example being eBay.

Although E-Commerce is still not widely used in the B2C and C2C categories (according to a recent government report, online retail sales are only 2.2% of all retail sales), it is playing an increasingly prevalent role in the lives of consumers, particularly those already using the Internet. However, online sales as a portion of overall sales has greatly increased recently and continues to do so. Doing business on the Web requires most of the same activities and components needed to successfully conduct business in the offline arena. Key components of running an e-commerce store or business may be categorized as follows: placement, merchandise and audience size, presentation, payment, security and fulfillment.

During the last few years, E-Commerce has brought about successful virtual companies such as Amazon.com and eBay.com. Amazon.com is just one example of an ever-increasing number of virtual companies that sells a growing number of new and used goods directly to the consumer. eBay is the world's number one online auction site in which people can buy and sell almost anything, including expensive automobiles on eBay Motors, subject to certain limitations. eBay allows shoppers to browse items from the comfort of their homes or offices, at any time of the day or night, and then submit a bid to purchase a product shown on the eBay web site.

Another type of exchange of good and services is barter. Users trade items they own directly for other items instead of cash. In general, the importance of barter in economies has declined after the introduction of money, but is regaining popularity as the Internet connects a large group of potential barter partners, thus increasing the chances of a successful exchange. A large number of barter web sites have sprung up, offering users the possibility of exchanging items they no longer want for items or services for which they have a need.

The primary problem with barter, however, is the need to match trade partners who are willing to exchange the specific goods or services they each have to offer. While the Internet makes it possible for people from distant locations to find such a partner, the likelihood of finding someone who needs your particular goods or services, while you need or want what that person has to offer in exchange, remains small. In other words, the probability of a successful two-way barter match between distant partners is not very high. It is even more unlikely that a closed multi-party trade transaction can be successfully initiated and closed.

Therefore, there is a need for a network-based barter system that solves the problems recited above and allows the users of a network, for example, the Internet, to exchange goods and services with other users of the network.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 5A shows block diagrams that schematically illustrate examples of how "OR" gates may be used in an NDES.

FIG. 5B shows block diagrams that schematically illustrate examples of how "AND" gates may be used in an NDES.

FIG. 5C shows a block diagram that schematically illustrates an example of exchanging groups utilizing an "OR" gate.

FIG. 5D shows a block diagram that schematically illustrates an example of exchanging groups utilizing an "AND" gate.

FIG. 5E shows a block diagram that schematically illustrates an example of the processes that may be performed by an NDES in forming a trading chain.

FIG. 5F shows a block diagram that schematically illustrates another example of the processes that may be performed by an NDES in forming a trading chain.

FIG. 14B shows a table of items that each of the traders in FIG. 14A have and wish to receive in return.

FIG. 16B shows a table of items that each of the traders in FIG. 16A have and wish to receive in return.

FIG. 21 shows a block diagram that schematically illustrates a trading scenarios in which several different permutations of closed chains may be found.

BRIEF SUMMARY OF THE INVENTION

A system for and a method of operating a real-time normalized, distributed exchange and barter system that allows multiple members to exchange multiple goods and services with other members of the system over a distributed network such as the Internet, substantially as shown in and/or described in connection with at least one of the following figures, as set forth more completely in the claims is disclosed.

Various advantages, aspects and novel features of the present invention, as well as details of an illustrated embodiment thereof, will be more fully understood from the following description and drawings.

DETAILED DESCRIPTION

This invention describes a system and a method for exchanging goods and services between multiple users over a network that shall be described in relation to example implementations described herein. In broad terms, a "normalized distributed exchange system" ("NDES") is a system enabling its users to list items or groups of items that these users wish to exchange, which items may be items that a user no longer wants or needs or may be items specifically produced for sale or exchange, and select other items or groups of items from a pool of such items or groups of items submitted by other users of the NDES that the user finds acceptable. These user-defined conditions allow the NDES to look for certain trade patterns through multiple users in order to satisfy their requests. In other words, the NDES creates a chain of trades that allows all the users participating in the chain at any particular time to exchange some or all of their items for some or all of the items listed that they find acceptable. The components described in this detailed description and the figures are an example implementation for some of many particular applications; however, the technologies and inventions described herein are much more general. The components may generally include a user-interface module (client side), a notification module, a chain seeker module, and an administrative interface module. Although this invention is readily applicable to the Internet, the invention as a whole applies to any system that establishes a barter and exchange system between multiple users over a network.

Figure 1:
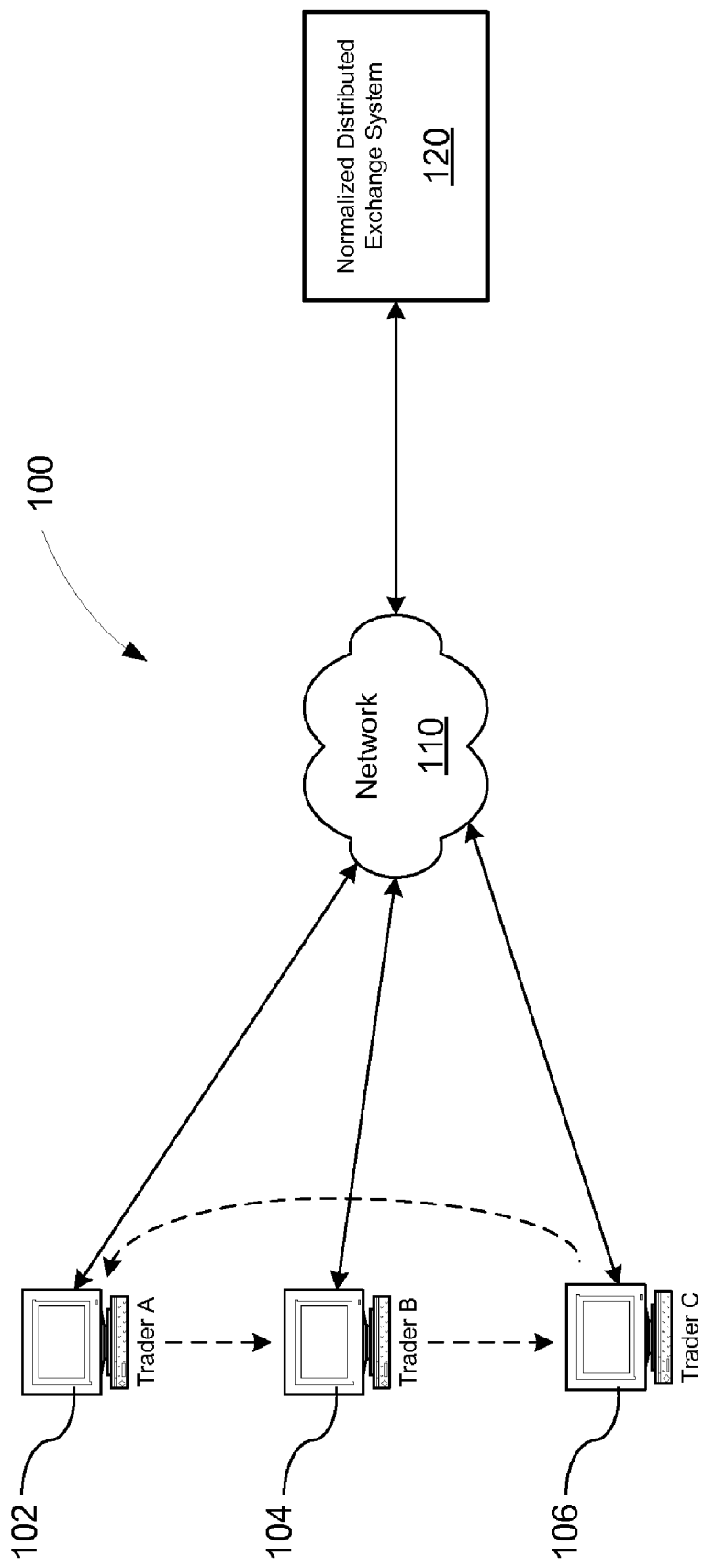
FIG. 1 shows a simplified system-level block diagram of an example implementation of a normalized distribution exchange system ("NDES").

Generically speaking, the combination of these components is a "normalized distributed exchange system" ("NDES"). FIG. 1 shows a simplified block diagram illustrating these basic components and their interconnection in an example implementation of an NDES. In FIG. 1, Trader A 102, Trader B 104, and Trader C 106 are all connected to NDES 120 through a network 110, for example, the Internet. In an example operation of this implementation of this invention, after the NDES determines and establishes a barter transaction and notifies the appropriate traders, Trader A 102 may be directed to send an item to Trader B 104, who in turn is directed to send an item to Trader C 106, who then completes the barter transaction by sending the appropriate item to Trader A, thus completing a single trade chain.

Figure 2:
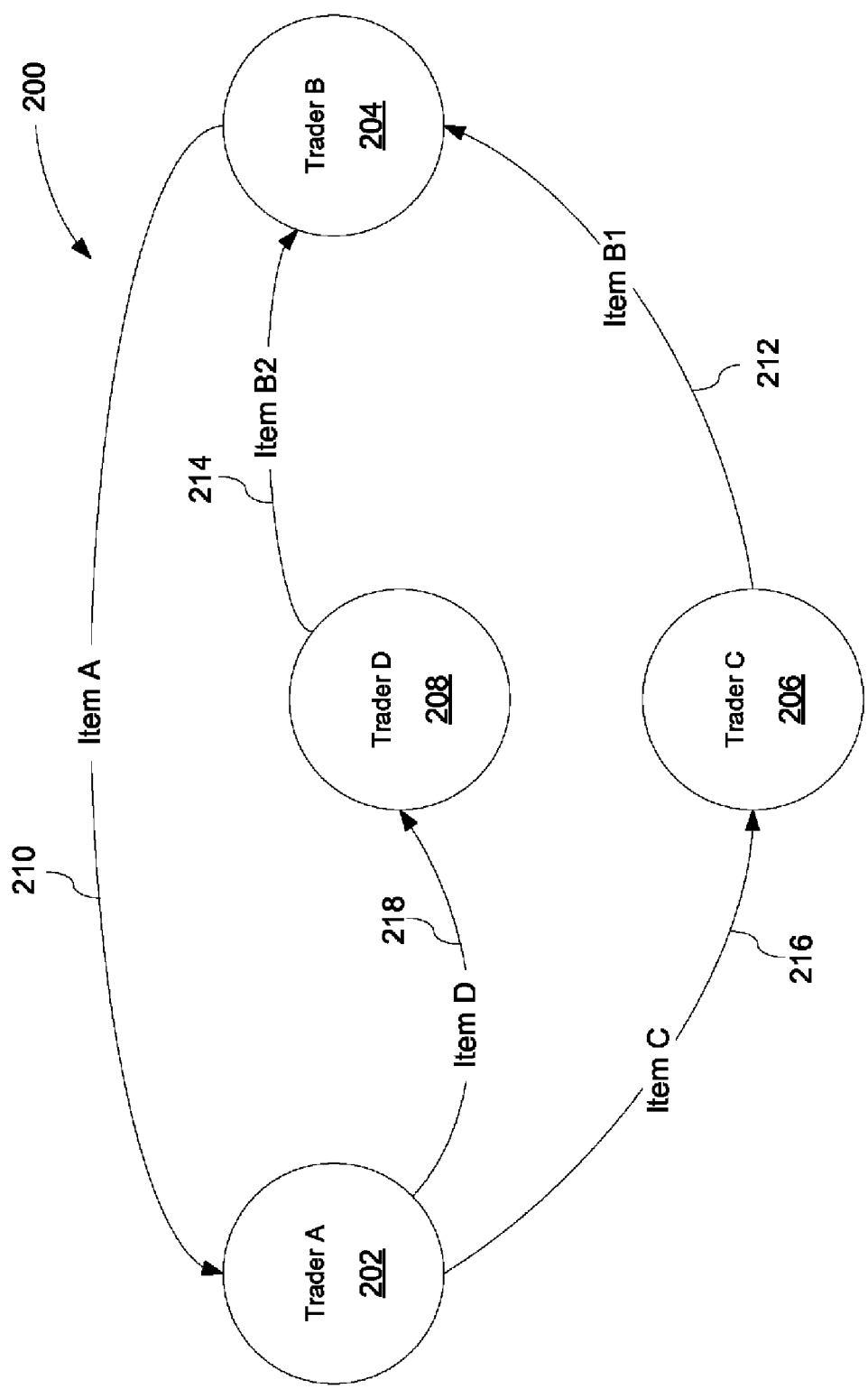
FIG. 2 shows a block diagram illustrating schematically a multi-party, multi-item, closed-chain transaction between four users.

FIG. 2 shows a block diagram illustrating schematically a multi-party, multi-item, closed-chain transaction 200 between four users, Trader A 202, Trader B 204, Trader C 206, and Trader D 208. In FIG. 2, arrows 210, 212, 214, 216, and 218 each represent a single exchange between two users, each of which may be referred to as a "chain link." In the form of notation used in FIG. 2, and also FIGS. 5A, 5B, 5C, 5D, 5E, 5F, 6A, 6B, and 7 as well, an incoming line indicates that the user from which the line originates wishes to receive, in exchange for the items or groups that user holds, the item or group receiving the incoming line, i.e., the item or group to which the arrowhead points. The item or group receiving the arrow will in turn send out its own "arrows," indicating those items or groups that user wished to receive.

As an example, in FIG. 2, chain link 210 represents Trader B 204 choosing to receive Item A, for example, a TV, from Trader A 202, while chain link 212 represents Trader C 206 choosing to receive Item B1 owned by Trader B 204, and chain link 214 represents Trader D 208 choosing to receive Item B2 also owned by Trader B 204. As for Trader A 202, he or she is willing to exchange Item A for Item C held by Trader C 206 and Item 218 held by Trader D 208, as indicated by chain link 216 and chain link 218, respectively.

In general, the NDES takes all of the chain links that have formed by users selecting items or groups, and then attempts to form permutations of closed-chain transactions utilizing these chain links. Again, FIG. 2 shows a closed-chain transaction 200 formed using chain links 210, 212, 214, 216, and 218. In any closed-chain transaction, the items or groups travel in a direction opposite of the arrows. Accordingly, the two items owned by Trade B 204, Item B1 and Item B2, are sent to Trader C 206 and Trader D 208, respectively, and in turn, Trader C 206 sends Item C to Trader A 202, and Trader D 208 sends Item D to Trader A 202. The final result is that Trader A 202 has exchanged Item A for Items C and D, Trader B 204 has exchanged Items B1 and B2 for Item A, Trader C 206 has exchanged Item C for Item B1, and Trader D 208 has exchanged Item D for Item B2.

Thus, FIG. 2 shows a closed-chain transaction between four traders with five items being traded between all of the traders in the transaction. The transaction is a closed chain in that all of the traders in the transaction have exchanged at least one item for at least one other item. Other traders may be included in the transaction, and each additional trader included must have at least one item to trade. For example, a Trader E (not shown) and a Trader F (not shown) may be added, and these two additional traders would be part of a closed-chain transaction if the NDES were able to create additional chain links whereby they would each receive an item or items in exchange for the items they wished to exchange. The NDES is a system that provides support services that enable online traders to participate in an exchange, that supports multi-party exchanges by seeking as many closed chains as are possible, and that also attempts to close chains that would otherwise remain open and to maximize the number of exchanges that are included in any single closed-chain transaction.

Figure 3:
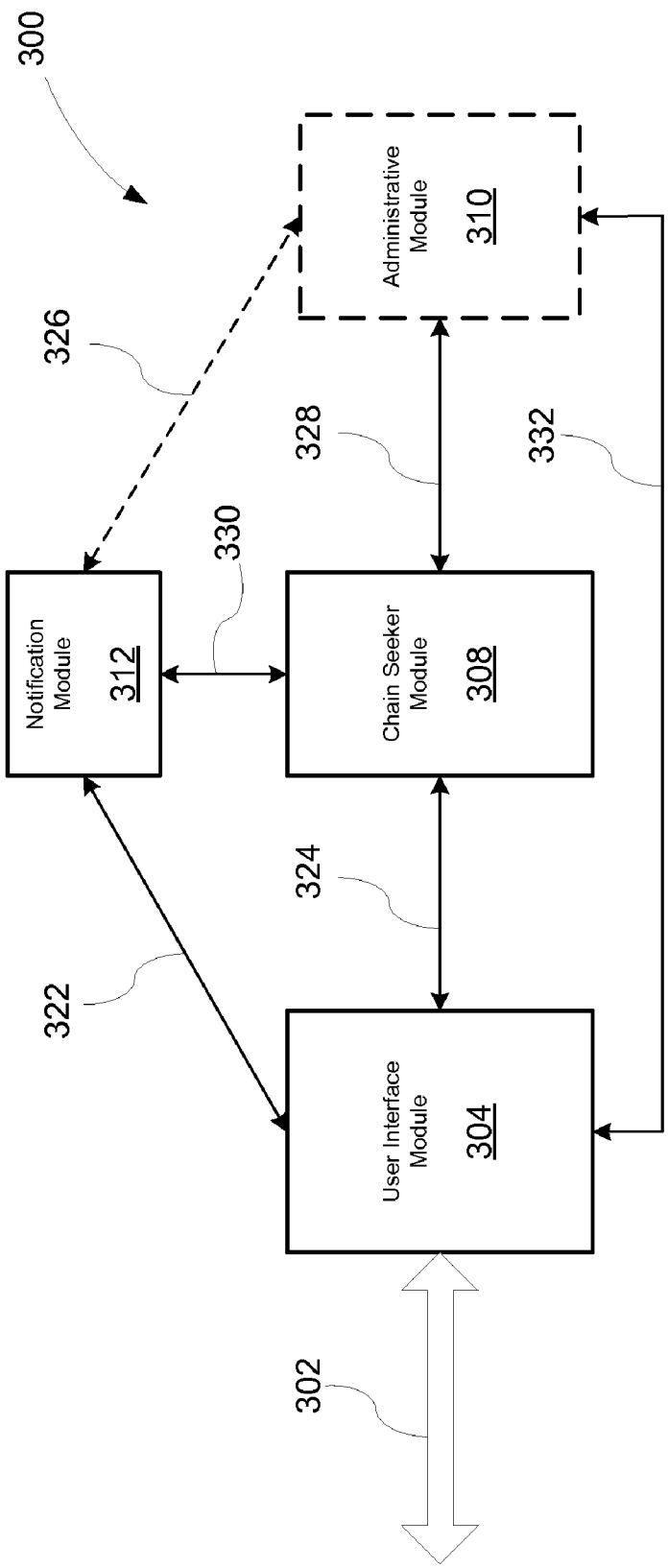
FIG. 3 shows a block diagram of the modules that may make up elements of an example implementation of an NDES.

FIG. 3 shows a block diagram of an example implementation of an NDES 300. The users (not shown) communicate with the NDES 300 via secure communication path 302 to the User Interface Module 304, which, in general, allows multiple users to access the NDES 300 and its various modules. (Note that any person or entity utilizing an NDES may be referred to as either a "user" or a "trader," depending on the context.) In general, the User Interface Module 304 may enable a user to list and describe the items available for exchange, set forth a cash equivalent value, select a group within which to place these items, and select exchange options, such as, for example, selecting items or groups where possible exchange items may be found. Additional secondary functions may also be included, such as providing feedback to the NDES about transactions and other users. An example implementation of the User Interface Module 304 is shown in more detail in FIGS. 10 through 12.

The Chain Seeker Module 308 may be in signal communication with the User Interface Module 304 via signal path 324. In general, the Chain Seeker Module 308 identifies and builds trade chains composed of chain links that have been formed by users selecting items or groups, as illustrated in FIG. 2. In general, the Chain Seeker Module 308 may then cycle through all of the chain links to construct all possible closed-chain transactions that may be formed utilizing all of the available chain links. Additionally, the Chain Seeker Module 308 may also select those closed-chain transactions that meet certain predetermined criteria. FIGS. 17 through 20 show in more detail examples of the various functions that may be performed by the Chain Seeker Module 308.

The Notification Module 312 may be in signal communication with both the User Interface Module 304 and the Chain Seeker Module 308 via communication paths 322 and 330, respectively. In general, the Notification Module 312 may be responsible for delivering various messages to the users, for example, messages regarding trading instructions, such as trade options, mailing addresses, etc.

The optional Administrative Module 310 may have communication paths to the Chain Seeker Module 308, the Notification Module 312, and the Administrative Module 310 via communication paths 328, 326, and 332, respectively. The Administrative Module 310 may be used primarily by the NDES administrators to monitor and maintain the NDES 300.

Figure 4:
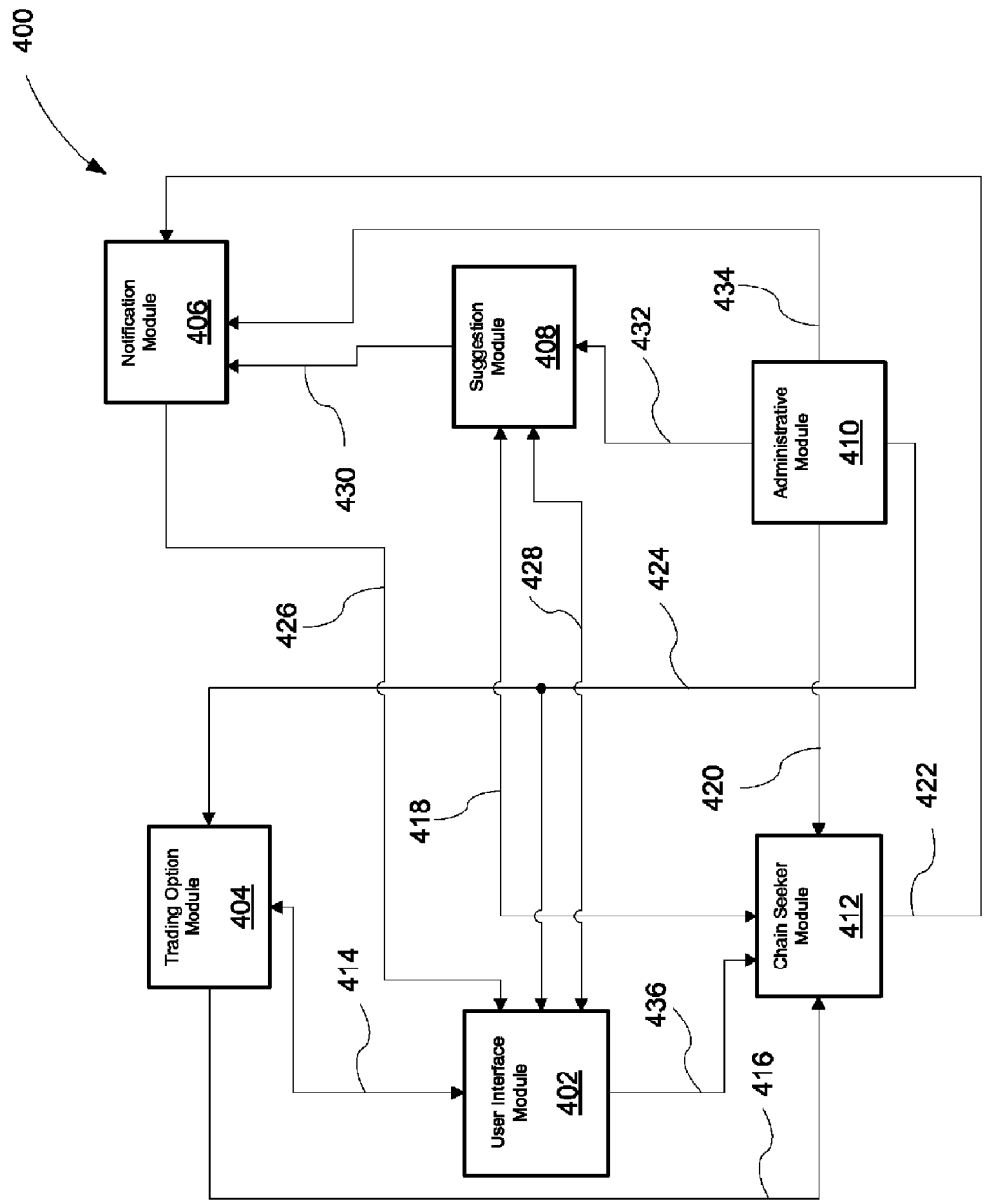
FIG. 4 shows a block diagram of another example implementation of an NDES with additional modules as elements.

Turning to FIG. 4, a block diagram illustrating another example implementation of the modules that may make up elements of an NDES is shown. Looking inside the NDES 400, there may be six different functional modules, which interact with each other allowing the NDES 400 to perform all of its desired operations. As an example, the User Interface Module 402 may include different functions that allow a user to perform tasks of listing items that the user wants to trade and selecting the items that the user would like to receive in return. Also the User Interface Module 402 may include a "wizard" (or submodule) that allows the user to specify if he or she would like to receive suggestions and if so, what kind of suggestions he or she would like to receive. User Interface Module 402 may also include additional submodules that enable the users to define their trading options. Thus an experienced user would be able to utilize the tools provided by this module and define their trading options by using "AND" and "OR" relationships. In case the user is not experienced enough or does not wish to utilize these tools, the User Interface Module 402 may, through the wizard, collect certain information from the user and then pass that information to the Trading Option Module 404 via communication path 414 or directly to the Chain Seeker Module 412 via communication path 436. The Trading Option Module 404 may define various chain links that the Chain Seeker Module 412 may utilize in closed chain creation.

As an alternative, the Trading Option Module 404 may take the information collected by the wizard from User Interface Module 402 via communication path 414 and automatically create possible trading options for inexperienced users based on the information collected by the wizard. In other words, the Trading Option Module 404 may take the guidelines defined by the user through the wizard and create all possible "AND" and "OR'" relationships along those guidelines in order to maximize the user's ability to trade the items that the user has, for the items that the user wants. These relationships and related information may then be transmitted directly to the Chain Seeker Module 412 via communication path 416.

Suggestion Module 408 may also receive data from the User Interface Module 402, via communication path 428, in terms of whether the user wants to receive suggestions and what type of suggestions the user would like to receive. Then, working with the information passed on from the Chain Seeker Module 412, the Suggestion Module 408 sends suggestions to the user via communication path 430 to the Notification Module 406, which fall within the suggestion guidelines that the user has defined in the wizard in User Interface Module 402. In general, the Suggestion Module 408 may be a complementary module for the Chain Seeker Module 412, which tries to close open trades by suggesting alternative items to the users.

The Chain Seeker Module 412 gathers all the information provided by the user to the User Interface Module 402 via communication path 436, or communication path 416 if the user has utilized Trading Option Module 404, and looks for possible trades that would satisfy the requirements defined by the user. With the information provided by users via the User Interface Module 402, the Chain Seeker Module 412 may build a chain link by matching items that a user has with other items the user may have indicated a desire to obtain, as well as close open chains by intervening in various ways.

The Suggestion Module 408 is that part of an NDES that may address the closing of open chains. Information about open chains from the Chain Seeker Module 412 may be passed to the Suggestion Module 408 via communication path 418, which looks at the user suggestion settings and provides suggestions to the users on the open ends of the chain according to their suggestion settings. In order to notify the users about suggestions, the Suggestion Module 408 may utilize the Notification Module 406. By using suggestions, the Suggestion Module 408 is looking for possible alternatives to close any open chains. In the event that suggesting different items to the users at the open ends of the chain does not work out because suggestions are being rejected, the NDES 400 might recursively send a suggestion to itself. In this case, the NDES 400 may impersonate a user and satisfy the needs of the users at the open ends of the chain, thereby closing the chain (this trading scenario will be described in greater detail in paragraphs below). The Suggestion Module 408 may also offer the user cash in lieu of the item that the user wants to receive, so that an open chain can be closed. This trading scenario may depend on the NDES 400 accepting the suggestion to itself to suggest that a certain amount of cash be given to the user in order to close the open chain.

In general, the Notification Module 406 may serve as a communication channel between the users and the NDES via communication path 426 to the User Interface Module 402. In this example of an implementation, the Notification Module 406 is primarily utilized by the Chain Seeker Module 412 via communication path 422 in order to notify the traders about the completed trades or by the Suggestion Module 408 in order to notify the traders about alternatives, so that trades could be completed.

Administrative Module 410 may be in signal communication with all the other modules in the NDES 400 via communication paths 420, 422, 432, and 434. Administrative Module 410 may be interconnected with all the other modules in the NDES 400 via communication paths 420, 422, 432, and 434. In general, the Administrative Module 410 may be designed to perform maintenance and managerial functions rather than operational functions. As an example, the Administrative Module 410 may provide information about the other modules of the NDES 400 and allow modification of the functions and operations of the other modules in order to improve their performance or to make certain corrections. Also the Administrative Module 410 may utilize the Notification Module 406 in the event system administrators need to pass on any information to the users.

FIGS. 5C, 5D, 5E, and 5F show schematic diagrams that illustrate examples of processes that may be performed by the Chain Seeker Module 412, FIG. 4, in forming a trading chain. The Chain Seeker Module 412 may utilize the Chain Identification Algorithm described below. In some cases, incomplete (open) chains may be identified, or some of the business considerations described below may dictate that chains are closed in a different way. In all these situations, the Chain Seeker Module 412 will attempt to create an optimal (as dictated by all constraints) chain and ensure that all necessary steps are taken for the trades that comprise the chain to be executed.

A chain link may consist of trades between two or more traders. Each trade may involve the exchange of two groups of items. In this context, the term "item" is used to represent an object or a service. If more than two groups of items, where a group may consist of a single item, are involved in the trade, the number of traders that participate in that trade may be greater than two because items may originate with different traders and reach the same single trader as a part of the same exchange. At the same time, any single item may be part of more than one group. A user that offers an item for exchange may include it as part of a single group, or as part of multiple groups, in which case only one of those groups can eventually participate in a trade. Thus, this detailed description refers to groups rather than individual items, because groups may be traded as a unit, but any group may contain multiple items that in turn may be part of multiple groups.

In its simplest form, a trade may consist of the exchange of one item for another single item. In its more complex forms, a trade may also involve the exchange of two or more groups, where each group may contain one or more items that may belong to multiple traders and that group is exchanged for another group of multiple items that may also belong to multiple traders. FIGS. 5C, 5D, 5E, and 5F each show a block diagram that illustrates the concept of exchanging groups and chain links, using a form of notation to illustrate some of the various ways in which chain links may be formed in an NDES. Again, the groups shown in FIGS. 5C, 5D, 5E, and 5F may each contain one individual object or service, or multiple objects, or multiple services, or a combination of services and objects. Moreover, the examples shown in FIGS. 5C, 5D, 5E, and 5F describe relationships between traders and groups and show examples of possible chain links that might be created in an NDES. This was done for purposes of illustrating the trader-group relationship concept and defining a type of notation used to illustrate these concepts, and also that each trader may establish a plurality of chain links by "pointing" to an arbitrary number of other groups.

FIG. 5A shows block diagrams that schematically illustrate examples of how "OR" gates, which may have one or more incoming lines into the gate and at least two outgoing lines, may be used in an NDES. An incoming line indicates that the user from which the line originates wants to exploit a trading option defined by the gate, that is, wants one of the items or groups that the "OR" gate is pointing to. In case the "OR" gate has more than one incoming line, this would indicate that one or more users wants to exploit the trading option defined by the gate in more than one scenario. In FIG. 5A, the two "OR" gates each have three outgoing lines, but may have as few as two or as many as are needed to represent the number of items that a user wants. The "OR" gate 502 defines a user's intention to receive one of the items or groups that the outgoing lines from the "OR" gate are pointing to. These gates will be used in the later figures to define a user's wishes to receive one of two or more groups or items in exchange.

Similarly, FIG. 5B shows block diagrams that illustrate how "AND" gates, which also have one or more incoming lines, may be used in an NDES. Each incoming line represents that a user, from which the line originates, wants to exploit a trading option defined by the "AND" gate. If the "AND" gate has more than one incoming line, that would indicate that one or more users wish to exploit the trading option defined by that "AND" gate in more than one scenario.

In FIG. 5B, the "AND" gates 504 are shown with one or two incoming lines and should have at least one incoming line, but may have more in order to represent the multiple scenarios that the trading option defined by that "AND" gate may be used in. The incoming lines may not have an upper limit. In FIG. 5B, the "AND" gates are shown with three outgoing lines, but may have as few as two with no upper limit on the number of outgoing lines. The outgoing lines represent the items that the user wants to receive in exchange. The meaning of these "AND" gates is that a single user wants to receive all of the items or groups that the outgoing arrows from the "AND" gate are pointing to. These gates also will be used in the later figures to define the user's wishes to receive more than one group or item together in exchange.

In FIGS. 5C, 5D, 5E, and 5F, and other similar block diagrams, an outgoing arrow indicates a trader's wish to acquire the group to which the arrow points, and once a closed-chain transaction is formed, the items in that group must be delivered in the reverse direction in order to complete the exchange. Turning to FIG. 5C, a block diagram that schematically illustrates the concept of exchanging groups and chain links using a specific example is shown. Trader A 506 has group 1 508, group 2 510, and group 3 512, and in exchange, wants either group 4 514, group 5 516, or group 6 518, with the alternative or "OR" relationship indicated by the OR gate 594. In FIG. 5D, trader B 520 has group 7 522, group 8 524, and group 9 526, and in exchange, wants to receive group 10 528, group 11 530, and group 12 532, with the multiple or "AND" relationship indicated by the AND gate 596.

In FIG. 5E, a block diagram that schematically illustrates another example of exchanging groups is shown. Trader F 558 has group 22 560, group 23 562, and group 24 564, which are being requested by trader C 534, trader E 552, and trader D 544, respectively. As for group 13 536, group 14 538, group 15 540, and group 15 542 held by trader C 534; group 17 546, group 18 548, and group 19 550 held by trader D 544; and group 20 554 and group 21 556 held by trader E 558, these groups will be sent to other users from which an arrow originates, for those groups that eventually become part of a closed-chain transaction.

A block diagram that schematically illustrates yet another example of exchanging groups is shown in FIG. 5F, wherein trader J 586 has group 32 588, group 33 590, and group 34 592, but only group 32 588 is requested by all three traders G 566, H 574, and I 580. As in FIG. 5E, group 25 568, group 26 570, and group 27 572 held by trader G 566; group 28 576 and group 29 578 held by trader H 574; and group 30 582 and group 31 584 held by trader I 580, one of these groups will be sent to other users from which an arrow originates, for that group that eventually becomes part of a closed-chain transaction; in this example, only one of the three groups can become part of a closed chain with group 32 588 because all three groups want that same group.

As described above, a group may comprise items from multiple users, not just one single user, if that group contains more than one item. As an example, while group 1 508, group 2 510, and group 3 512 in FIG. 5C clearly represent items from single trader A 506, group 4 514, group 5 516, group 6 518 in the same figure may represent items from multiple users, if indeed any of these groups contain more than one item.

Figures 6A, 6B:
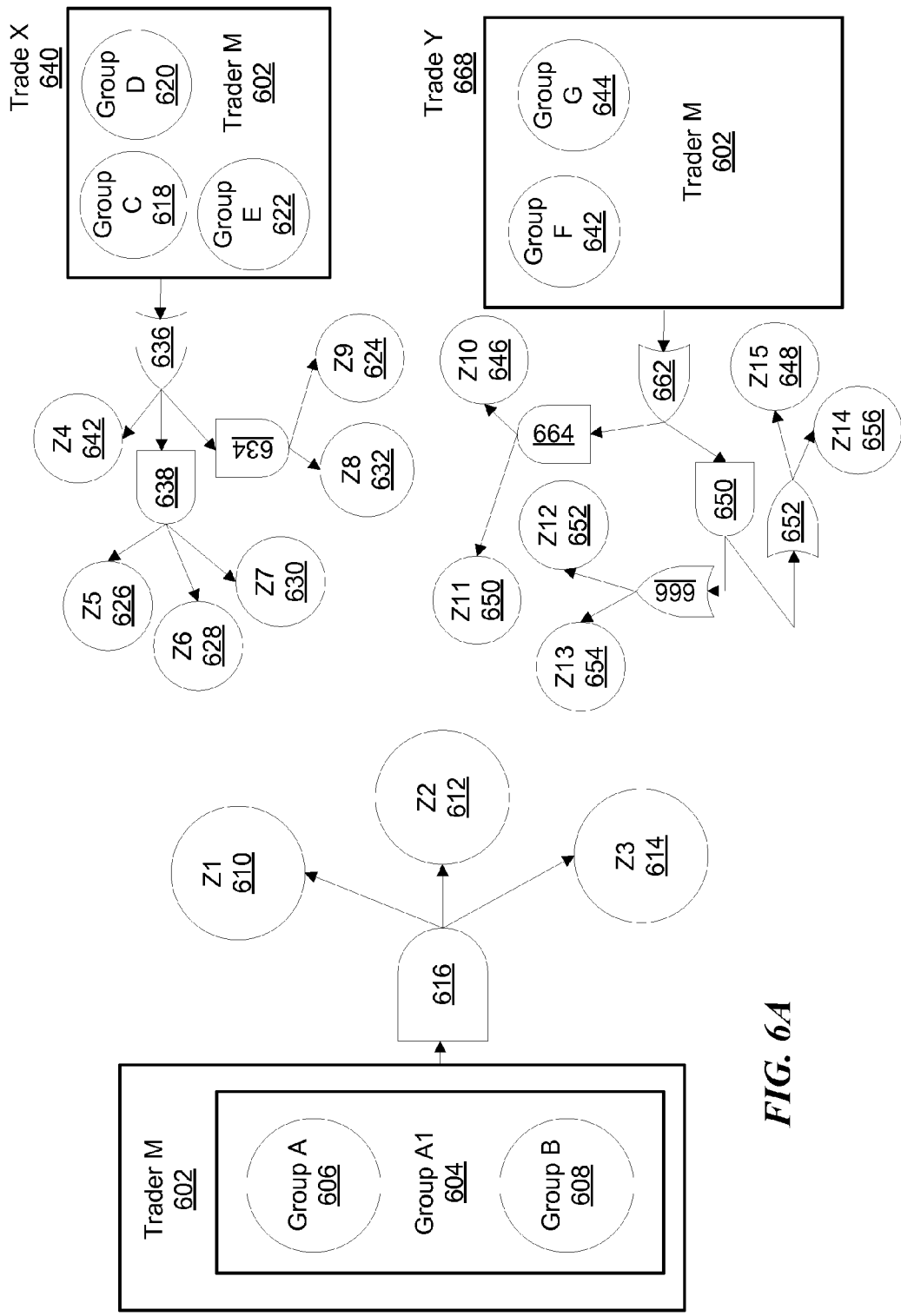
FIG. 6A shows a block diagram that schematically illustrates an example of the various ways a user of the NDES may chose to define the exchange of his or her items or groups of items.
FIG. 6B shows a block diagram that schematically illustrates another example of the various ways a user of the NDES may chose to define the exchange of his or her items or groups of items.

FIG. 6A shows another block diagram that schematically illustrates another trading scenario, wherein a user utilizes "AND" and "OR" relationships in order to define different ways his or her items or groups of items may be exchanged. In FIG. 6A, Trader M 602 has group A1 604, which comprises group A 606 and group B 608. That means that trader M 602 would like to trade group A 606 and group B 608 as a single group instead of exchanging them separately. Also, FIG. 6A shows that trader M 602 wants items or groups of items Z1 610, Z2 612, and Z3 614 in return, as indicated by AND gate 616. This illustrates an example of multiple items grouped together being exchanged for multiple items that may or may not come from multiple traders.

In addition to providing different trading options, the NDES may also allow users to effect different trades. That is, a trader is able to list one part of his or her items or groups of items and define the options he or she would like to explore in trading these items or groups. At the same time, the trader may also have the ability to create another trade later after adding other part of his or her items or groups and defining new trade options for the newly added items or groups. An example of this trading scenario is illustrated in FIG. 6B, where trader M 602 has defined two trades, trade X 640 and trade Y 668. In trade X 640, trader M 602 has three groups, which may each contain one or more items, and has defined three different options as indicated by OR gate 636 whereby these groups may be traded. In the first option, trader M 602 may exchange groups of items C 618, D 620 and E 622 for a group Z4 642. In the second option, trader M 602 may receive group Z5 626, group Z6 628 and group Z7 630 in exchange for the same groups C 618, D 620 and E 622, as indicated by AND gate 638. In the third option, trader M 602 is willing to exchange groups C 618, D 620 and E 622 for groups Z8 632 and Z9 624 as indicated by AND gate 634.

In trade Y 668, the same trader M 602 has included two of his or her groups, group F 642 and group G 644, and defined five different ways these groups could be traded as denoted by OR gates 662, 652, and 666, and AND gates 664 and 650. In the first option, trader M 602 may exchange groups F 642 and G 644 for groups Z10 646 and Z11 650. Also trader M 602, in a second option, has expressed a desire to exchange groups F 642 and G 644 for groups Z12 652 and Z14 656 as indicated by AND gate 650 and OR gatedf 652 and 666. These same three gates may also indicate a third option, whereby trader M 602 is willing to exchange groups F 642 and G 644 for groups Z12 652 and Z15 648, a fourth option whereby trader M 602 is willing to exchange groups Z13 654 and Z14 656 in exchange for groups F 642 and G 644, and a fifth option defined by trader M 602 receiving groups Z13 654 and Z15 648 in exchange for groups F 642 and G 644.

An option to create new trades expands a user's possibilities and gives each of them greater control over their own trades. By creating new trades, users may exchange their newly-listed items or groups for items or groups that were not listed among the trade options in previous trades. Even though users may also modify existing trades by adding or removing items or trade options, a method of creating new trades is advantageous because it allows users to manage smaller lists of traded items or groups and their options.

In another example trading scenario, which may occur more often than other trading scenarios, the user lists only the items he or she has without grouping any of them them in any manner and then only selects the items he or she wants, also without any grouping. In this type of trading scenario, the NDES then has complete freedom to form as many groups as necessary to exchange as much as possible of the offered items and at the same time give a user as many as possible of the wanted items. This type of trading scenario may increase the probability of successful exchanges because the NDES is then able to use items offered in any form (form in this case referring to a group or a single item) in order to complete as many chains as possible and obtain for the user items that he or she wants. As described above, however, users are not restricted to this trading scenario and may themselves specify which items should be exchanged for other items.

Figure 7:
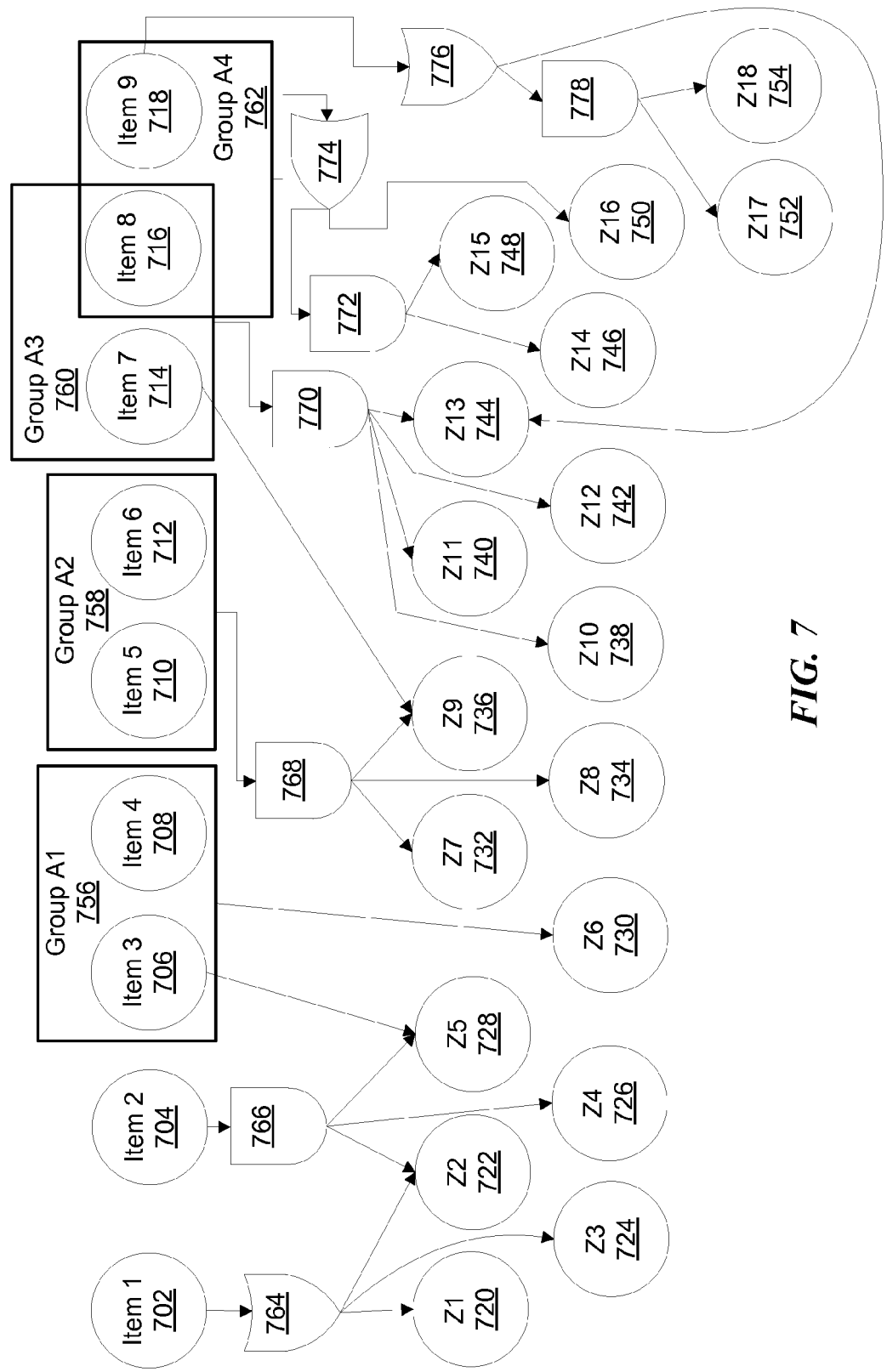
FIG. 7 shows a block diagram that schematically illustrates an example of a user-defined trading scenario where there is a single user having multiple items and groups of items available for exchange.

Turning to FIG. 7, block diagrams that illustrate user-defined types of trading scenarios are shown. Items 1 702, 2 704, 3 706, 4 708, 5 710, 6 712, 7 714, 8 716, and 9 718 represent the items that a single user owns, and items Z1 720 through Z18 754 represent items or groups of items that the user wants. The arrows and the "AND" and "OR" gates represent the exchange scenarios that are user-defined. In this trading scenario, the user is telling the NDES to exchange his or her item 1 702 for an item or a group of items Z1 720, Z2 722, or Z3 724, as indicated by OR gate 764. Similarly, the user is also willing to exchange item 2 704 for items or groups of items consisting of Z2 722, Z4 726, and Z5 728, as indicated by AND gate 766.

Also, the user is willing to exchange the group A1 756 for item or group of items Z6 730, but at the same time he or she might be willing to trade item 3 706, which is a part of group A1 756 for an item or group of items Z5 728. Additionally, the user wants to exchange item 5 710 and item 6 712 as a group A2 758 for items or groups of items Z7 732, Z8 734, and Z9 736, as indicated by AND gate 768. The user may also be willing to exchange group A3 760, consisting of item 7 714 and item 8 716, for items or groups of items Z10 738, Z11 740, Z12 742, and Z13 744, as indicated by AND gate 772, but at the same time is also willing to exchange item 7 714 for an item or group of items Z9 736. Moreover, the user wants to exchange group A4 762, which includes item 8 716 (which is also a part of group A3 760), and item 9 718, for items or groups of items Z14 746 and Z15 748, as indicated by AND gate 772, or Z16 750, as indicated by OR gate 774. Also, the user may be exploring his or her options further and is considering trading item 9 718 separately for items or groups of items Z17 752 and Z18 754, as indicated by AND gate 778, or Z13 744, as indicated by OR gate 776.

FIG. 7 thus illustrates that many permutations of trades are possible and that while user-defined trades appear to increase the user's options, there is also the possibility that such user-defined trades may restrict the NDES in its attempts to complete trades. For example, in FIG. 7, item 1 702 may be exchanged only for items or groups of items Z1 720, Z2 722, or Z3 724, which might not be possible at any given time because items or groups of items Z1 720, Z2 722, and Z3 724 may not be in the NDES, may be involved in other trade chains, or the chain that would allow the user to obtain any of these items or groups of items simply cannot be closed although at the same time, it may be possible to trade item 1 702 for different combinations of items or groups of items Z4 726 through Z18 754.

In this case, that could not be done because the user has explicitly failed to define that particular trade as an option. The same applies to the other items, which may also be restricted to only certain user-defined trades. Thus there may be a drawback with some user-defined trades in that some users might create conflicts by defining trading options that are incapable of being completed. There are several solutions to this problem that may utilized by the NDES, including overriding a user's preference not to receive suggestions and then offering the user alternative exchanges or asking the user to re-define or revise his trading options.

A disadvantage from the user's point of view may be the situation when certain trades could not be completed because other trades including a particular item or group have been executed. As an example, looking at item 1 702 and item 2 704 in FIG. 7, if item 2 704 is traded first, then item 1 702 may still be traded for items or groups of items Z1 722 or Z3 724. However, if item 1 702 is traded first and is traded for item or group Z2 72, then item 2 704 cannot be traded at all because it would not satisfy initial requirements in that item 2 704 is required to be traded for Z2 722, Z4 726, and Z5 728, but the user already received Z2 722 in exchange for item 1 702 and thus Z2 722 is no longer available for exchange. Therefore the item 2 704 trade is in a state of deadlock and the user may need to edit it.

Another example of this type of trading scenario may also be illustrated with FIG. 7. Item 2 704 is offered for items or groups of items Z2 722. Z4 726, and Z5 728. At the same time item 3 706 is also offered in exchange for an item or a group of items Z5 728. Also item 3 706 is a part of the group A1 756, which as a group is offered for an item or a group of items Z6 730. In case item 3 706 were to be traded for an item or a group of items Z5 728, then item 2 704 and group A1 756 could not be traded in accordance with FIG. 7. According to the user-defined trading options, item 2 704 may only be traded for Z2 722, Z4 726, and Z5, but in this situation Z5 has already been received by the user in another trade and is therefore no longer required. In this case, the user would have to adjust his or her trading options for item 2 704 to be traded, otherwise the item would be in a deadlock state. Additionally, if item 3 706 is traded, then group A1 756 can no longer be traded because it now contains only one item, instead of two as initially defined. At the same time, item 4 708 cannot be traded as a single item either, because no trading options were defined to do so. In this situation, item 4 704 would also be in a deadlock state because the user did not define a trading scenario whereby item 4 708 could be traded as a separate item.

Figure 8:
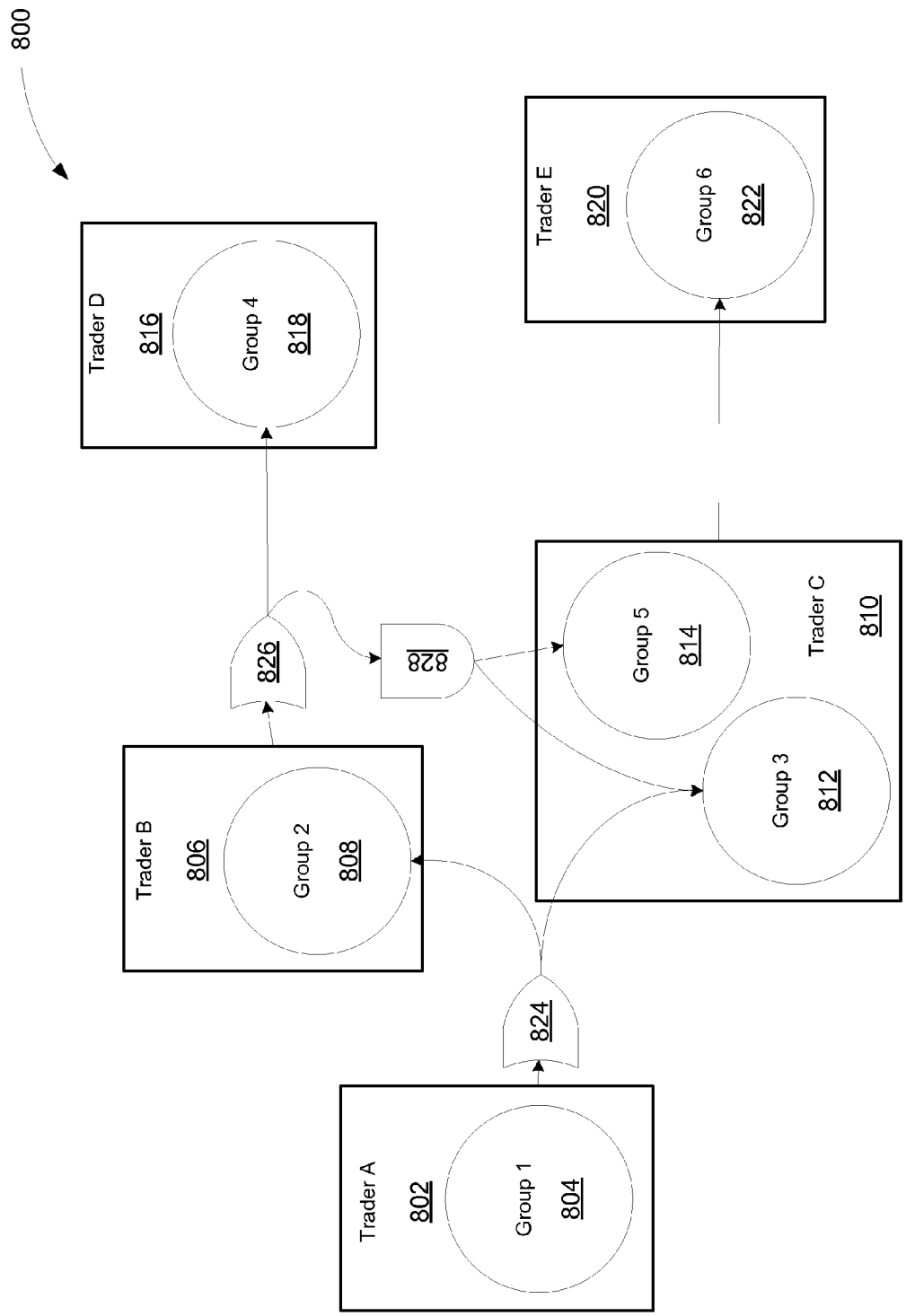
FIG. 8 shows schematic examples of partial chains that might be possible in the NDES.

Using the notation convention shown in FIG. 5, FIG. 8 shows a block diagram schematically illustrating an example of a chain link that has several alternative paths. In FIG. 8, Trader A 802 wants group 2 804 or group 3 808 and has group 1 804 that he or she wants to exchange. Trader B 806 wants group 3 812 and group 5 814 (as indicated by AND gate 828) or group 4 818 (as indicated by OR gate 826) and has in his or her possession group 2 808 to be exchanged. Trader C 810 is willing to trade groups 3 812 and 5 814 and wants to receive group 6 822 in exchange.

There are several other possible chains that may be identified in the example of FIG. 8. For instance, trader A 812 wants group 2 808, from trader B 806, who wants groups 3 812 and 5 814 from trader C 810, who wants group 6 822 from trader E 820, which automatically creates a valid partial chain. Another valid partial chain may be formed by trader A 802 wanting group 2 810 from trader B 806, who wants group 4 818 from trader D 816. One more valid chain may be formed by trader A 802 wanting group 3 812 from trader C 810, who wants group 6 822 from trader E 820. Again, items need to be delivered in the reverse direction of the arrows in FIGS. 5C, 5D, 5E, 5F, 6, 7, and 8. Thus, for the trading scenario where trader A 802 wants group 2 808 from trader B 806, who wants groups 3 812 and 5 814 from trader C 810, who wants group 6 822 from trader E 820, trader E 820 would need to deliver group 6 822 to trader C 810 who would need to deliver group 3 812 and group 5 814 to trader B 806, who would need to deliver group 2 808 to trader A 802.

At any given moment, many such potential alternative chains may exist in the NDES, and each chain may or may not share groups. In order for transactions to be executed successfully, however, these chains need to be closed, forming a loop that will allow all users participating in the chain to receive the group or groups they have selected. The goal of the Chain Seeker Module 308, FIG. 3, is to identify and form such closed chains. While the NDES may contain thousands of items at any given moment, with hundreds of open or closed chains, the purpose of the Chain Seeker Module 308 is to maximize the number of transactions so that as many users as possible have their choices satisfied. In order to achieve this goal, the Chain Seeker Module 308 may need to artificially create chain links in order to close chains that would otherwise remain open. Several methods for closing chains are described below.

In the event an existing open chain cannot be closed using existing links, the Chain Seeker Module 308 may choose to close it using the cash equivalent of one or more groups. When listing items and forming groups, users may also indicate the cash equivalent value of any of these items. This signifies that the user will accept a specified amount of cash instead of the items they have selected for exchange. In this context, the term "cash" refers to any official or unofficial, real or virtual, currency. The user that sits at the end of an open chain may then pay a specific amount of cash to the user at the opposite end of the open chain, thus closing the chain.

Figure 9:
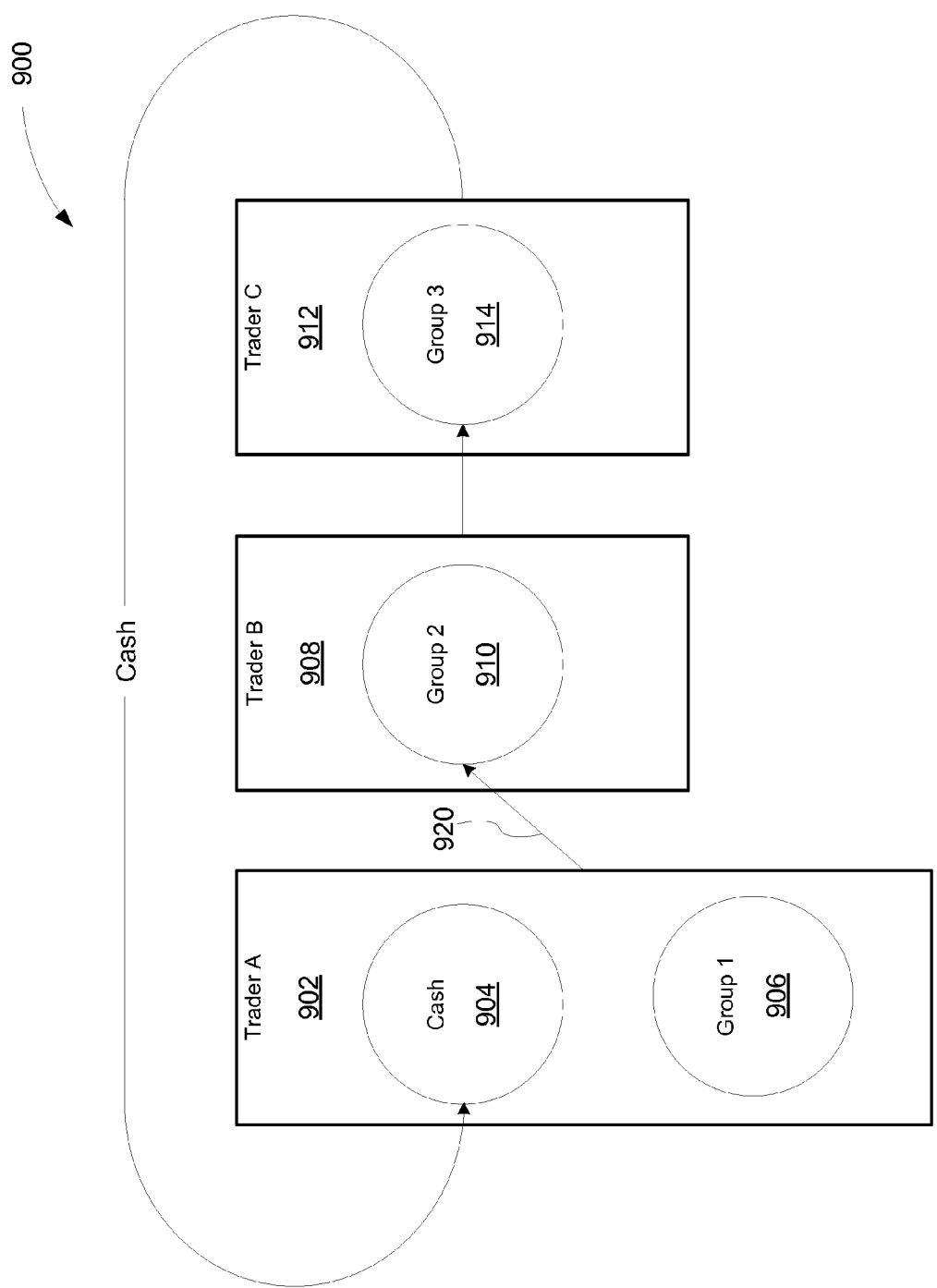
FIG. 9 shows a possible scenario of exchanging cash instead of an item or group of items.

Turning to FIG. 9, a block diagram illustrating an example of a trading scenario utilizing cash is shown. In FIG. 9, arrows represent the interests of the traders by having the arrow point to a desired item or group of items. Thus, arrow 920 indicates that trader A 902 is interested in group 2 910 owned by trader B 908, who in turn is interested in group 3 914 owned by trader C 912, who is interested in receiving group 7 (not shown) in exchange. As an example, group 7 may not be in the NDES at this particular time. As an alternative, trader C 912 may be willing to accept a specified cash amount that he or she has defined when listing the value of group 3 914 in terms of money. In this case, trader C 912 would have to ship group 3 914 to the trader B 908, who would then have to ship group 2 910 to the trader A 902, and the trader A 902 would have to pay trader C 912 the designated amount of cash, rather then sending group 1 906.

The Chain Seeker Module may also decide to attempt closing open chains by making suggestions to the users at the open ends of a chain via the Suggestion Module 406, FIG. 4. These suggestions may be for items the users did not initially select and may include items similar to those already selected, etc. A few examples are presented below.

Users may normally select groups (items) that they want in exchange for their own groups (items), but the NDES has the capability to form chains even without all users establishing such links. If a user at the end of a chain does not establish any links, the NDES may suggest groups that would close the chain to the user if the user has previously chosen to receive suggestions while setting his or her trades and trade options. If the user accepts the suggestion, the chain may then be closed. In the event the user has established links, but they cannot be used to close any chains, the NDES may suggest alternative links, created using items similar to those the user had used to create the links initially. The NDES may also suggest, according to the user selected suggestion strategies, any groups from the system, only new groups that were entered into the system after the user defined his or her trading options, or groups that only fall in a certain category that the user has defined in his or her suggestion strategies. The similarity of two or more items or groups may be established based on keywords in the descriptions of the items, listing category, etc. As before, suggestions for similar items may be made such that a closed chain may be formed, although a user has the option to choose not to receive any suggestions if he or she already defined items or groups that he or she wants. In this case, the NDES may choose to search for alternative ways to close open chains.

The NDES and its collection of groups and items are dynamic, which means that items may be added to and removed from the system at any time. Thus, there may constantly be some newly listed items that may not have yet come to the attention of users who have already established links. Therefore, as already described above, according to certain user suggestions strategies, the Suggestion Module, using the same principles of similarity and chain closing ability, may attempt to close chains by identifying and presenting newly added items to users.

In the event that all attempts to close a chain using the methods outlined above fail, the Suggestion Module may close a chain by having the NDES impersonate a user. In this mode of operation, the Chain Seeker Module may essentially create any missing links for open chains that have the potential of being closed. This in turn will result in some items being delivered to the NDES by the user at one end of the chain, and the NDES having to potentially deliver items or send cash to users at the opposite end of the chain. In general, this trading strategy may be utilized only if the sum of payments for the executed trades in a particular chain is greater than the price of the group or the amount of the cash that needs to be sent by the NDES to the user at the end of the open chain. Considering that this trading scenario becomes more likely as the number of trades in a chain increases, the NDES may also include warehousing and inventory management features that allow it to keep track of items in its possession and coordinate their later exchange and delivery. The NDES may also utilize certain cash funds in such a way as to optimize the closing of chains, in the interest of boosting profits, e.g., maximizing profit by selecting the longest chain, the greatest number of chains, or the chains with the costliest items, where the amount of cash collected for executed trades while closing the chain or chains would exceed the value of the item or group or the amount of cash that the NDES needs to ship to the user at the end of the open chain.

The interaction of users with the NDES is primarily concerned with listing the items that a user has available for exchange, grouping these items in order to create item groups that are to be exchanged, and selecting groups or items that other users have listed for exchange. In order to create links, users may also choose to define trading options utilizing "AND" and "OR" gates similar to the examples in FIGS. 6A and 6B. In addition, users may perform secondary actions such as leaving feedback about their transactions and the other users they transact with. Generally, all of these and other related functions may be performed utilizing the User Interface Module 402, FIG. 4.

Figure 10:
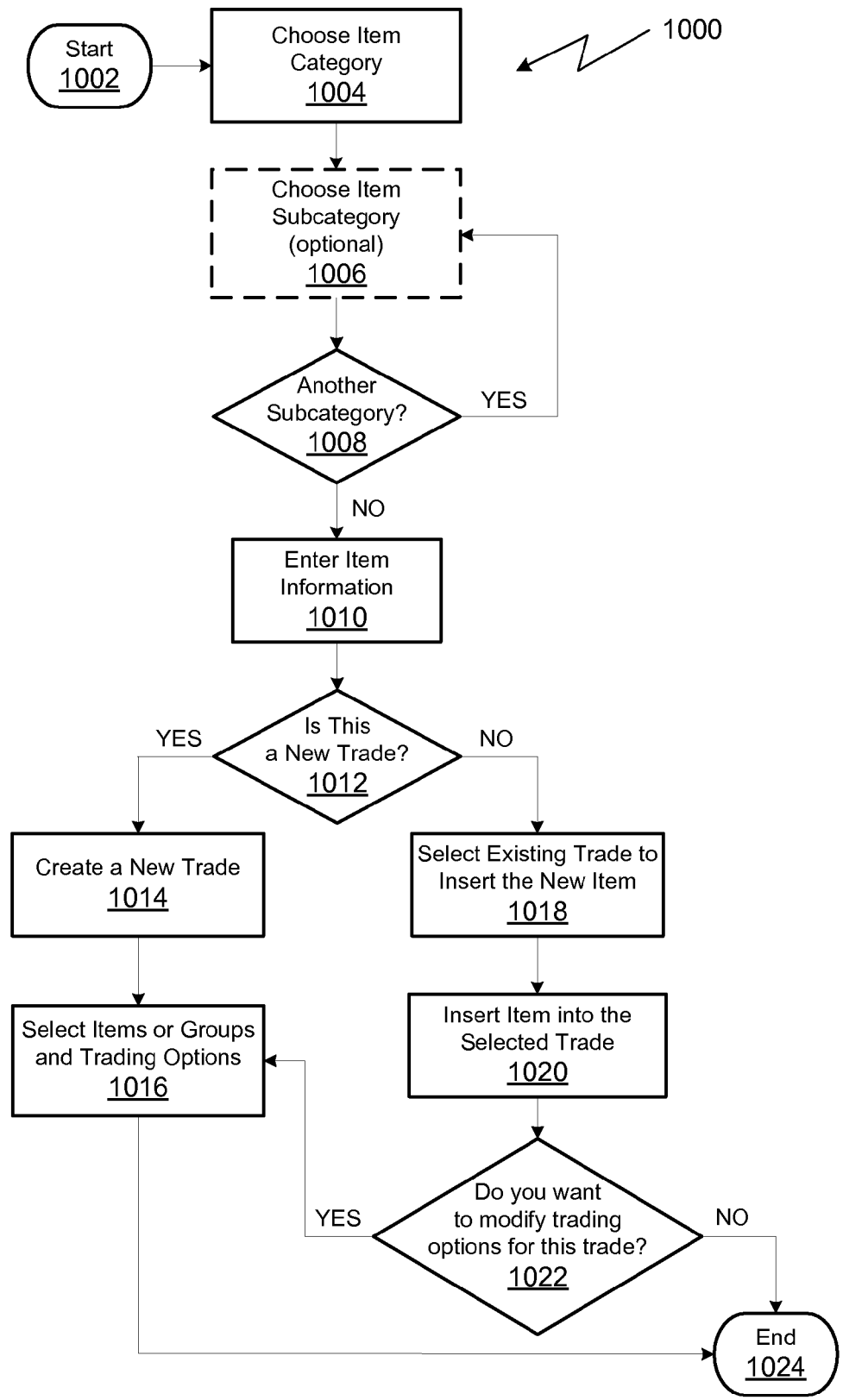
FIG. 10 shows a flow diagram of an example process for listing items for exchange in the NDES.

In FIG. 10, a flow diagram illustrating an example process for listing items for exchange in an NDES is shown. The process 1000 starts in step 1002, and in step 1004, the user selects a category for the item he wishes to offer for exchange. In optional step 1006, the user may select a subcategory for the item or group he or she is offering for exchange. In decision step 1008, the user has a choice to select a narrower subcategory for the item or group being listed and if he chooses to do so, the process returns to step 1006. If the user decides not to enter a subcategory at this point, the process 1000 proceeds to step 1010, where the item or group information is entered by the user. In decision step 1012, the user is asked if he or she wants to add the item or group to an existing trade or create a new trade. If the user wants to create a new trade, he or she then proceeds first to step 1014 to create a new trade and then to step 1016 to select items or groups he or she wants to receive in exchange and selects his or her trading options in order to define ways he or she wants to receive those items. Step 1016 is explained in greater detail in FIGS. 11 and 12.

In case the user does not want to create a new trade for this particular item or group, the process 1000 then proceeds to step 1018, where the user can insert the item or group in one of his or her existing trades. From step 1018, the process 1000 then proceeds to step 1020 where the user is asked if he or she would desire to update his or her trading options for that particular trade. If the user is willing to do so, then he or she then proceeds to step 1016. If the user chooses not to do that, then he or she is being taken to step 1024 where the process terminates.

Figure 11:
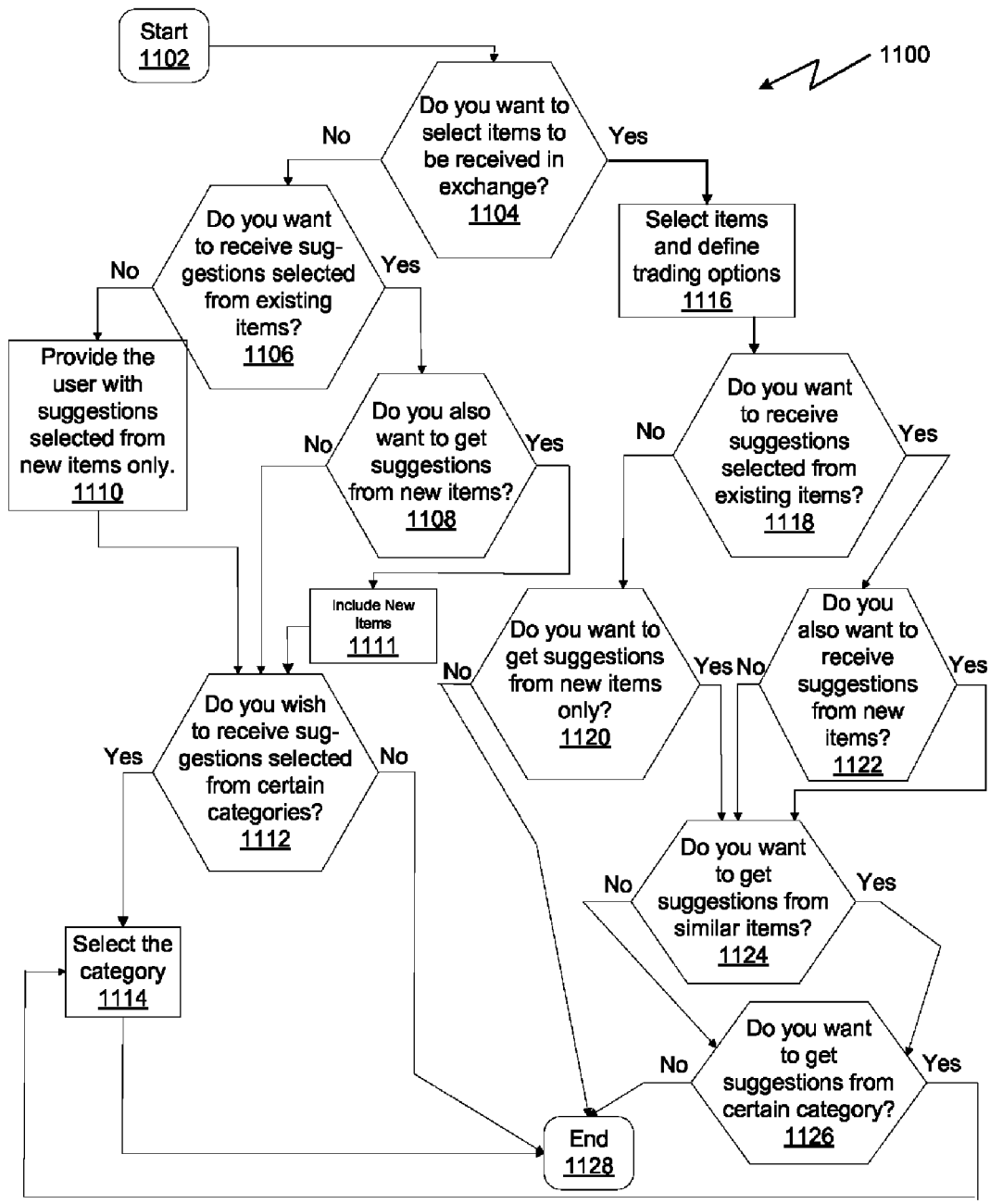
FIG. 11 shows a flow diagram of an example process for a trader selecting a suggestion strategy.

In FIG. 11, a flow diagram illustrating an example process by which users may choose to receive or not receive suggestions from the NDES is shown. The process 1100 starts in step 1102 and in decision step 1104, the user is asked whether he or she wants to select the items to be received in exchange. If the user chooses to not to select items, the process 1100 then proceeds to decision step 1106, where the user is asked if he or she would prefer to receive suggestions selected from existing items in the NDES. This particular option allows the NDES to suggest any items or groups of items to the user in order to close open chains, which allows the user to explore more options for exchange and increases the probability of the NDES closing chains.

If the user chooses neither to select items nor receive suggestions selected from existing items, process 1100 then proceeds to step 1110, where the NDES mat automatically provide the user with suggestions selected from newly arrived items that are not yet in the NDES. Having chosen not to select items nor receive suggestions, by default the user's only option remaining is to either select items from newly arrived items or receive suggestions selected from these newly arrived items; otherwise, no chain links may be formed that include that user. Receiving suggestions selected from new newly arrived items allows a user to examine items or groups of items that may not have been available at the time the user was selecting items for inclusion in his or her wanted item list. By introducing new items or groups of items to the users, there is the potential of bringing something to a user's attention that the user might otherwise not have considered, thus increases the probability of that the NDES will be able to close an open chain.

In decision step 1112, the user is asked once again if he or she wishes to receive suggestions only from certain categories of items or groups of items. If the user chooses not to narrow the scope of suggestions, the process 1100 proceeds to step 1128, where the process 1100 terminates. Otherwise, the process 1100 proceeds to step 1114, where the user is able to select the categories from which the suggested items or groups of items will be selected by the NDES. Although this option is more restrictive than providing suggestions from all existing items or groups of items in the NDES, the suggestions provided by the NDES may have a higher probability of being accepted by the user because that particular user has expressed an interest in items or groups of items from that category. The next step is step 1128, where the process 1100 terminates.

If the user in decision step 1106 chooses to receive suggestions, the process 1100 proceeds to decision step 1108 where the user is asked if he or she would also like to receive suggestions from newly arrived items that are not yet in the NDES. If the user chooses to receive suggestions taken from newly arrived items or groups of items, the process 1100 proceeds to step 1111, where the newly arrived items are included with the items or groups of items already in the NDES for possible use as suggestions to a user. If the user chooses not to receive suggestions from newly arrived items or groups of items, the process 1100 proceeds directly to step 1112.

If the user in decision step 1104 chooses to select the items him or her self, the process 1100 proceeds to step 1116, where the user is able to select items or groups of items and define trading options. An example of a process whereby a user may select items or groups of items to receive in exchange is shown in greater detail in FIG. 12. In decision step 1118, the user is asked if he or she would also like to receive suggestions taken from existing items. If the user chooses not to receive suggestions from the existing items, the process 1100 proceeds to decision step 1120 where the user is asked if he or she would like to receive suggestions selected from newly arrived items. If the user also chooses not to receive suggestions from the new items, the process 1100 proceeds to step 1128, where the process 1100 terminates.

If, in decision step 1120. the user chooses to receive suggestions selected from the newly arrived items, then that user will proceed to step 1124, where he or she user may choose to receive suggestions selected from similar items that he or she already listed as being acceptable. Although this option is a little bit narrower than the option of selecting suggestions from all existing items or groups of items; it nevertheless provides an additional opportunity for the NDES to provide certain suggestions to a user in order to close open chains, thus increasing the probability of closing open chains.

If the user chooses to receive suggestions similar to those items he or she has already listed as acceptable in decision step 1124, then that user preference is recorded by the NDES and the user proceeds to decision step 1126. In case the user chooses not to restrict suggestions to similar items only, that choice is also recorded by the NDES and the user then proceeds to decision step 1126. In decision step 1126, the user is given the option to select a category of items or groups of items that will narrow the scope of suggestions he or she will receive. If the user chooses to do so, he or she then proceeds to step 1114, where the category may be selected. If the user does not want to restrict suggestions to a certain category or categories, then the process 1100 will proceed to end of the process 1100 at step 1128.

If, in decision step 1118, the user chooses to receive suggestions selected from existing items, he or she then proceeds to decision step 1122. In decision step 1122, the user is asked if he or she would also like to receive suggestions selected from newly arrived items. As in step 1108, the user's decision is recorded by the NDES, and regardless of the decision, the process 1100 then proceeds to step 1124 and from there to the end of the process 1100 at step 1128.

Figure 12:
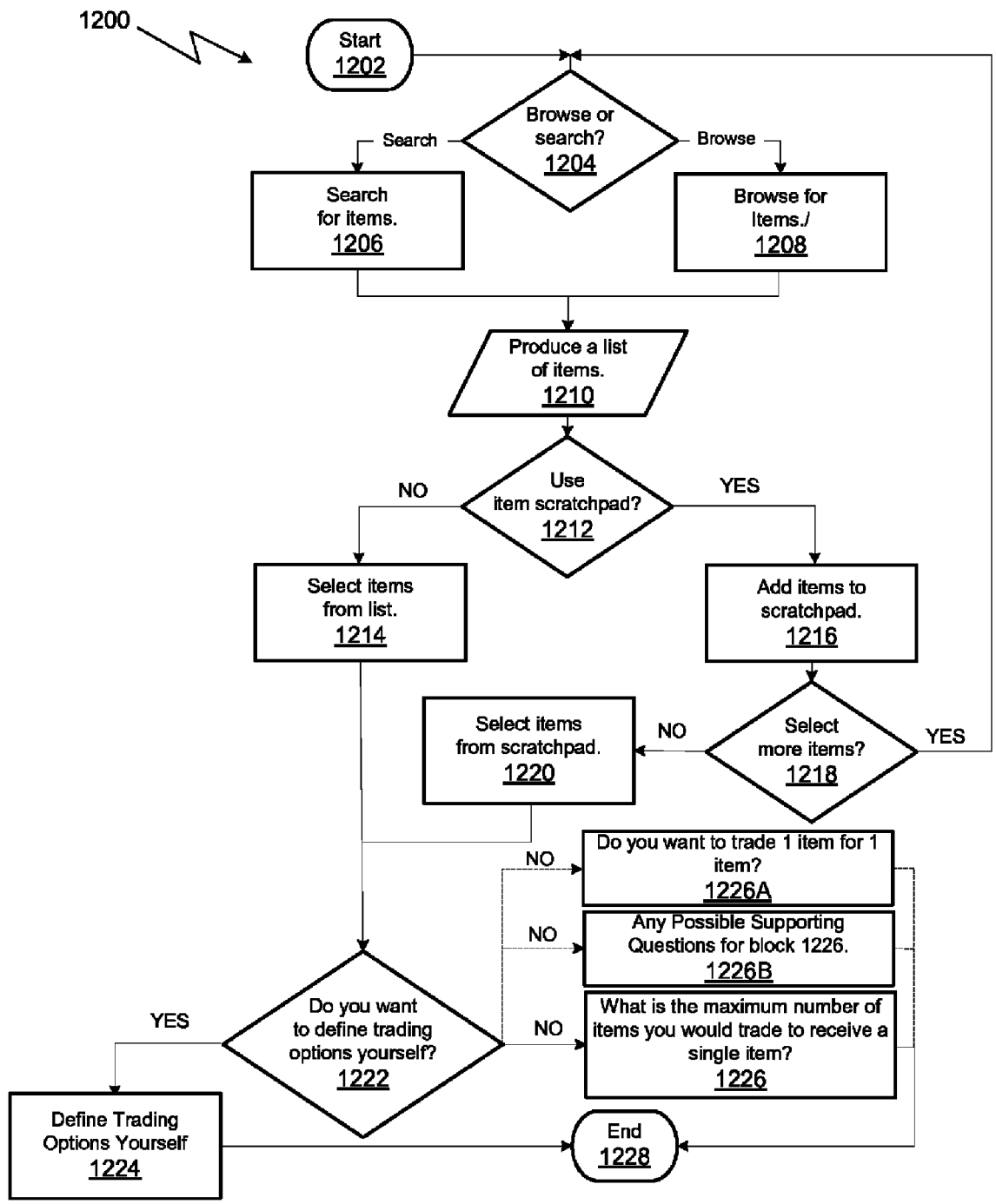
FIG. 12 shows a flow diagram of an example process for selecting items or groups that a user would like to receive in return.

In FIG. 12, a flow diagram illustrating an example process whereby a user may select items or groups of items for exchange in the NDES and define his or her trading options is shown. The process 1200 starts in step 1202, and in decision step 1204, the user may elect to either browse or search for items or groups of items that may be of interest to him or her. If the user elects to search for items, the process 1200 proceeds to step 1206 where the user searches for items he or she may want to receive in exchange for his or her own items. If the user elects to browse for items, the process 1200 proceeds to step 1208 where the user browses for the desired items, the difference being that a browse procedure, in general, may be conducted manually by allowing a user to examine lists of categories and subcategories and then look at specific items, groups and their descriptions him- or herself, while searching allows a user to receive a list of items or groups of items in the NDES that match the keyword the user has utilized to perform a search In either case, the end result is a list of items produced in step 1210. In decision step 1212, the user may choose to use a scratchpad, which may take the form of any temporary display or list made available to the user. If the user chooses not to use a scratchpad, the process 1200 proceeds to step 1214 where the user may select the items or groups of items from the list of items presented in step 1210. After the user has defined items or groups of items he or she would like to receive in exchange, in decision step 1222, the user is asked if he or she would like to define trading options him- or herself. If the user chooses to define trading options him- or herself, the process 1200 proceeds to step 1224 where the user may define trading options by using "AND" and "OR" relationships and creating different groups of desired items, an example of which is shown in FIG. 6A.

Thus, the defining of trading options by a user in step 1224 may be elected by a user and allows that user to explicitly tell the NDES how his or her items should be exchanged using "AND" and "OR" gates to define certain trading scenarios that they would like to explore. By using "OR'" gates, a user is able to specify multiple trading scenarios that the NDES can then explore, and one or more of these trading scenarios, if it can be made a part of closed chain, could then be executed by the NDES. The "AND" gates allows users to group items or trading scenarios, each of which may in turn be created utilizing the "OR" gates. This option allows a user to add value to the trade, while expressing a wish to receive more items in exchange for those the user wants to trade him- or herself. Using these two gate types, a user is able to define all permutations of trading options that the NDES is required to follow in order to trade the user's items. Though this option adds some complexity to the NDES, step 1224 allows a user to make his or her own decisions and gives that user more control on how his or her items will be traded.

After defining trading options in step 1224, the process 1200 proceeds to step 1228, where the process 1200 terminates. If the user wants the NDES to create trading options for him or her, then the user proceeds to step 1226, where he or she is asked what would be the maximum number of items the user would be willing to trade in order to get a single item in return. The user input in this step is recorded, by the NDES so that it may use this parameter when trying to create and close open chains later in the process. In step 1226, the NDES records the answers of the user and later in the process will create all possible permutations of trading options within the guidelines received from the user. That is, the NDES will create all possible permutations of trading scenarios by deriving all of the possible paths through the "AND" and "OR" gates defined by the user. The greater the number of items the user is willing to give up in order to receive a single item in exchange, the more trading scenarios the NDES will be able to generate, thereby giving the user more chances to get the item he or she wants.

Although the NDES derives all possible trading scenarios, the one that will be executed may be, for example, the one that is part of the first closed chain. The trade that will be executed, however, may not necessarily be the one in the best interest of the user. For example, if the user has five items and wants to receive two items in exchange, but at the same time is willing to trade all five items to receive one item, the NDES may trade all of his or her items for the single item that the user wants, thereby satisfying these requirements, but at the same time, leaving the user without the possibility to receive the second item that he or she wanted. While it might be a trivial way to define trading options by letting the NDES do this, the user actually gives up all control to the NDES over the way his or her items will be traded. Steps 1226A and 1226B connected via dotted line are optional steps that may complement step 1226 in order for the NDES to obtain more specific information about the user's intentions in terms of possible exchanges. The next step is step 1228 where the process 1200 terminates.

If in step 1212, the user chooses to use the scratchpad, he or she may add items to the scratchpad in step 1216. In decision step 1218, the user may choose to select more items for addition to the scratchpad. If the user decides to select more items, the process 1200 returns to step 1204. In the event the user does not want to select more items, he or she can select the desired items from the scratchpad in step 1220, after which the process proceeds to step 1222, where the user may choose to define his or her trading options as described above.

Figure 13:
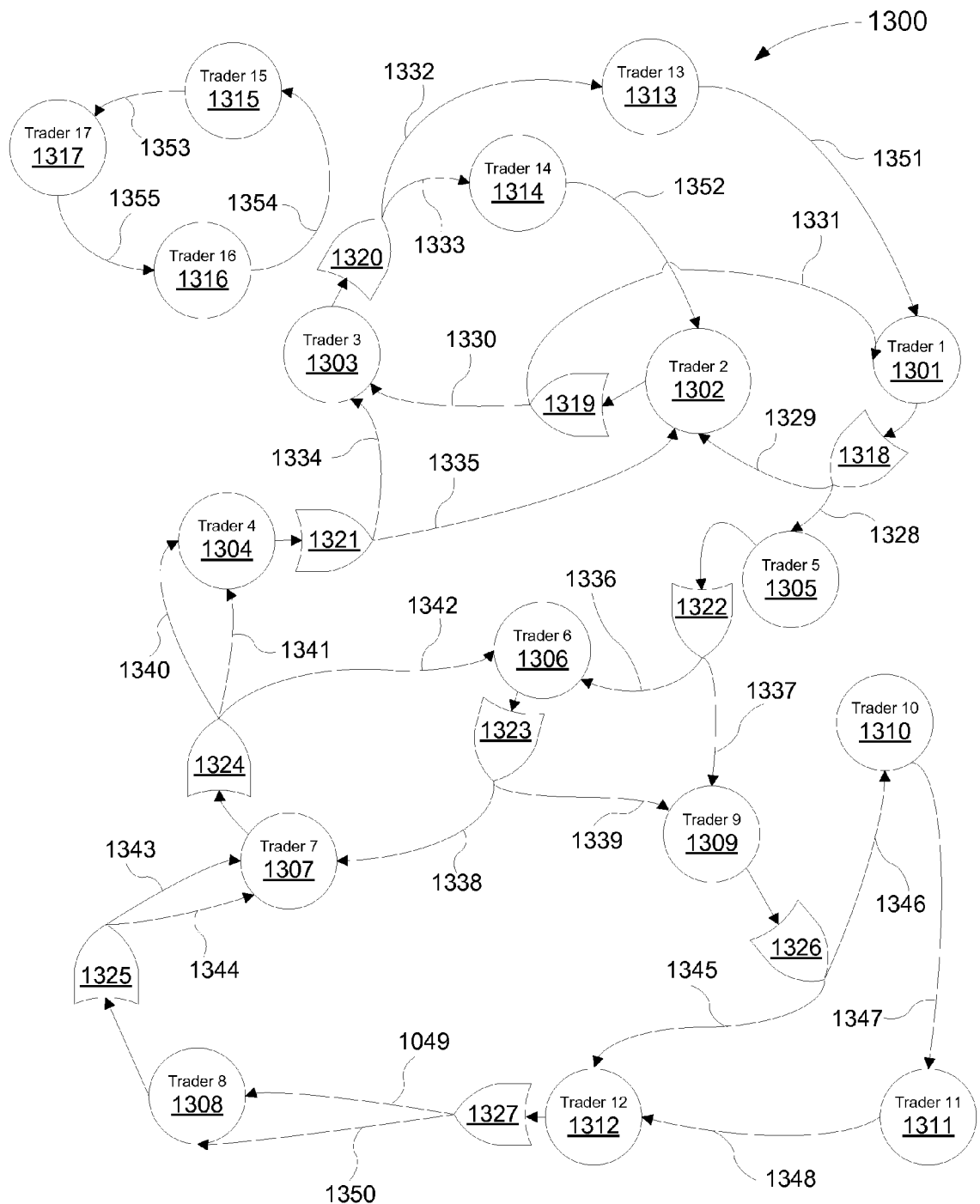
FIG. 13 shows a schematic diagram of the relationship between multiple traders and an NDES participating in a distributed exchange.

FIG. 13 shows a schematic diagram illustrating an example of a relationship between multiple traders and an NDES participating in a distributed exchange. Each trader that is participating, trader 1 through 17, is represented by nodes 1301, 1302, 1303, 1304, 1305, 1306, 1307, 1308, 1309, 1310, 1311, 1312, 1313, 1314, 1315, 1316, and 1317, respectively. FIG. 13 graphically represents all permutations of possible exchanges between the traders participating in an example trading scenario in an NDES at any given point in time. In general, the NDES first determines all of the possible permutations and then selects that permutation that contains the maximum number of exchanges or meets some other predetermined criteria.

First, with respect to FIG. 13, each node is shown using the notation convention previously shown in FIGS. 5C, 5D, and 5E. That is, for each node, each outgoing arrow represents a group of one or more items or services wanted by the trader represented by that node from other traders represented by the node or nodes to which the arrows point. If there is more than one outgoing arrow, each outgoing arrow may be pointing to a group that is wanted and that may be the same as or different than, in whole or in part, the group or groups that are being pointed to by the other outgoing arrow(s). Second, a chain is closed by reaching the initial node from another node whose outgoing arrow is directed at the initial node, whether going directly back to the initial node or after passing through one or more other nodes.

As an example, the chain formed by trader 15 1315, trader 17 1317, and trader 16 1316 is a closed chain in its simplest form. These three nodes graphically represent trader 15 sending his group to trader 16, who then sends his group to trader 17, who in turn sends his group to trader 15, thereby closing the chain. The sending of items as explained above travels in the opposite direction of the arrows, as long as the arrows represent the items that the trader from which the arrows originate wants.

When there are multiple traders with multiple groups available for exchange between each other, there may be a large number of possible exchange distributions between the traders present in the NDES, these possible exchange distributions being permutations of the set comprising traders and groups. In general, to determine all permutations of exchanges possible within a given set of traders and exchanges at any given time, the NDES may first select a single node and then proceed to identify all possible closed trade chains that originate with the trader represented by that node. That process may be repeated for every existing node in the NDES and then the largest closed chain or any other chain depending on predetermined criteria is selected for execution later in the process. After that, the process may be repeated again to find new closed chains.

For example, starting with trader 1 1301 in FIG. 13, one possible permutation of a closed chain transaction is the chain formed by links 1329, 1330, 1332, and 1351, which graphically represents an exchange between trader 1 1301, trader 2 1302, trader 3 1303, and trader 13 1313. The NDES may then proceed to identify another chain, which may be the chain formed by the links 1328, 1337, 1346, 1347, 1348, 1349, 1343, 1341, 1334, 1332, and 1351, which graphically represents an exchange between trader 1 1301, trader 5 1305, trader 9 1309, trader 10 1310, trader 11 1311, trader 12 1312, trader 8 1308, trader 7 1307, trader 4 1304, trader 3 1303 and trader 13 1313. Because trader 9 1309 has two traders wishing to receive his group in exchange for their respective group, another permutation is possible and therefore the NDES may determine if another chain may be identified by sending trader 9's group to trader 6 1306 rather than trader 5 1305. This process may be repeated if further down the chain, additional nodes having multiple groups for exchange are found.

The NDES may employ different algorithms and/or procedures to identify one permutation of cycles in the NDES that satisfies predetermined business criteria. One possible instance of such algorithms is described here as an example. Once the NDES has identified all possible chains with trader 1 1301 at the root, the process of identifying all other chains with each of the remaining nodes at the root is repeated for each remaining node. Upon completing the process of identifying all closed chains, the NDES will then proceed to find the closed chain that contains the greatest number of exchanges or meets any other predetermined criteria. In FIG. 13, the closed chain formed by links 1353, 1354, and 1355, which graphically represents an exchange between trader 15 1315, trader 16 1316, and trader 17 1317 may be completed because none of these traders are found in any closed chains identified by the NDES for the remaining traders. Thus, in choosing those chains with the most exchanges, the NDES may first select that permutation that has the most exchanges, and select additional permutations so long as those permutations do not have any common traders with the previously selected permutation.

Figure 14A:
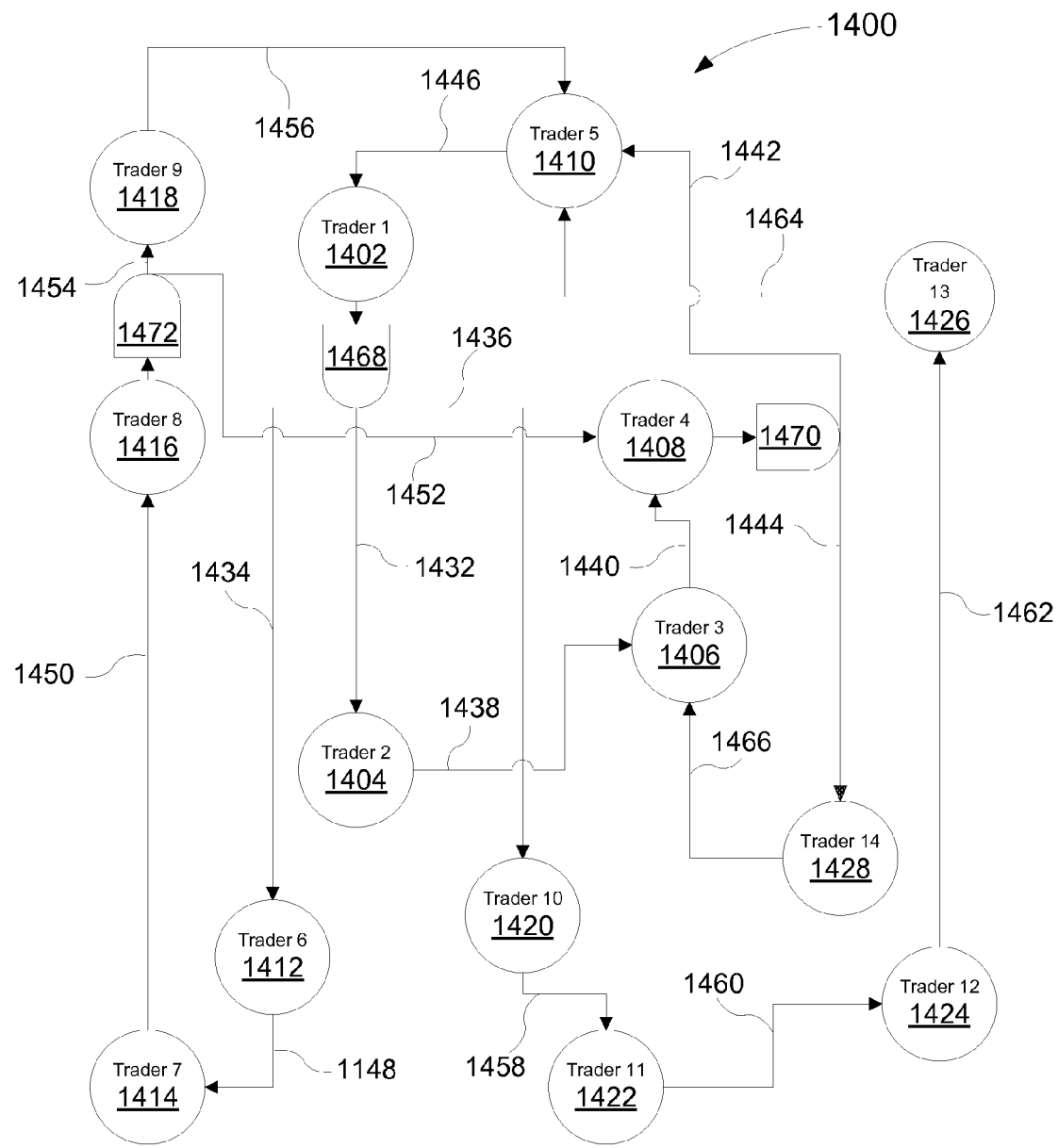
FIG. 14A shows another schematic diagram of the relationship between multiple traders and an NDES participating in a distributed exchange.

FIG. 14A shows a schematic diagram illustrating another example of the relationship between multiple traders participating in a distributed exchange and an NDES. In FIG. 14A, each trader takes part in exchanges and unlike FIG. 13, there are no traders that are left out. In FIG. 14A, trader 1 1402 has one item, which may be, by way of example, a plasma TV, in exchange for which he or she would like to receive a blue bicycle, a football, and a scanner. Trader 6 1412 has a blue bicycle, but wants a red bicycle in exchange. Trader 2 1404 on the other hand has a scanner, but wants a digital camcorder. Trader 10 1420 also appears to have a football, but wants a hand bag in exchange. Trader 6 1412 wants a red bicycle, which trader 7 1414 has. Trader 7 1414 in turn wants a scooter in exchange for his red bicycle. Trader 8 1416 has a scooter and he or she wishes to exchange it for a tricycle and $50.00 in cash. To effect the completion of this exchange, an NDES may identify other exchanges between other traders so that the desired exchanges may take place.

An example of such a process may be as follows. Trader 6 1412, who happens to have blue bicycle, but wants a red bicycle, ships the blue bicycle to trader 1 1402, in return for which he or she receives the blue bicycle from trader 7 1414. In turn, trader 7 1414 gets the scooter from trader 8 1416, who then gets the tricycle from trader 9 1418 and $50.00 in cash from trader 4 1408. After sending the tricycle to trader 8 1416, trader 9 1418 receives a digital camera from trader 5 1410. After sending $50 to trader 8 1416, trader 4 1408 receives a projector from trader 5 1410 and a "Titanic" DVD from trader 14 1428. In turn, trader 14 1428 receives a DV tape from trader 3 1406. Trader 3 1406 on the other hand, gets a laptop from trader 4 1408 and sends his or her digital camcorder to trader 2 1404, so that this trader may then send his or her scanner to trader 1 1402. Also trader 5 1410 may send a book, which is the third item that he has, to trader 13 1426, who in turn sends his or her tripod to trader 12 1424. Then trader 12 1424 may sends his or her sweater to trader 11 1422, so that he or she can send his or her hand bag to trader 10 1420. In this case, trader 10 1420 then sends his football to trader 1 1402, who finally acquires all three items that he or she wanted and sends his or her plasma TV to trader 5 1410, which closes the open chain.

FIG. 14B shows in tabular form the distributed exchanges between each of the fourteen (14) traders shown in FIG. 14A. For each trader shown in the first column, there are additional columns, with the first three columns listing those items that each trader has available for exchange, followed by three additional columns listing those items each trader will be receiving in exchange when this particular trading scenario is executed. Additional columns may be added either for items available for exchange or for items received in exchange as needed.

FIGS. 14A and 14B illustrate the use of cash to normalize exchanges in that some traders may offer cash in whole or in part "in exchange" for other items owned by other traders participating in the NDES. In this distributed exchange, trader 4 1408 has a laptop and $50.00 in cash, and trader 8 1416 wants a tricycle and $50.00 in return for his scooter, as shown in FIG. 14B. Moreover, the NDES may itself be configured to use cash to complete a chain; that is, the NDES itself may elect to inject a payment of cash into the system in order to allow a larger chain to be closed.

Also unlike FIG. 13, FIGS. 14A and 14B illustrate an example of users wishing for a plurality of items in exchange for the single item they have available for exchange. This scenario is exemplified by the use of "AND" gates in FIG. 14A to represent that a trader indeed wants to receive a plurality of specific items he or she wants in return.

For a better understanding of the processes described in FIGS. 13 and 14A, these processes may also be described in the form of an algorithm that may be used to implement an example implementation of an NDES. An example of a set of notations for such an algorithm may be as follows.

At any time in an NDES, there are a total number of items available for exchange, which is the sum of all discrete items that the traders have to offer. Let the following sets be defined as follows:

P—the set of all items in the system (offered for exchange by various users);

T—the set of all users of the system (traders);

G—the set of all groups of items in the system; a group of items is a subset of P that contains those items that a particular trader has selected as part of a possible trade (option); a trader always selects two groups as part of the same option, one group of items that he is interested in, and another group of items that he is willing to offer in exchange for the first group; each group must contain at least one item but may also contain more than one item; and O—the set of options of all traders; each item $O[i, j]$ in O represents a relationship between two groups of items $G_W[i, j]$ and $G_O[i, j]$ such that $G_W[i, j]$ is a group of items desired (wanted) by trader i and $G_O[i, j]$ is the group of items that trader i is willing to offer in exchange for $G_W[i, j]$; $O[i, j]$ is thus a function of $G_W[i, j]$ and $G_O[i, j]$; note that all items in $G_O[i, j]$ must belong to the same trader, while items in $G_W[i, j]$ may belong to various traders.

The following notation is used for O:

O[i]—the set of all options of trader i; O[i] is a subset of O; and

O[i, j]—the option j of trader i; O[i, j] is an item of the set O.

In addition, the following temporary sets, which are used by the algorithm, may be defined as follows:

PK—the item "bank"; this set is initially identical to P;
PA—the set of available items; this set is initially empty;
PB—the set of "borrowed" items; this set is also initially empty; and
PT—the set of traded items; this set is also initially empty.

Turning to a description of the algorithm, it has been noted that each trader establishes one or more options for trades. A trade cycle $TC_k$ is defined as a subset of O, where each option belongs to one trader:

$$TC_k = f(O[p_1, q_1], O[p_2, q_2], \ldots, O[p_n, q_n]).$$

In the relation above, $p_n$ represents a distinct trader, and $q_n$ represents one of the options of that trader. Note that while p must be distinct in this relation (no two options from the same trader may participate in the same cycle), q may be repeated. The purpose of this algorithm is to identify $TC_k$ such that the number of trades is maximized and the cycle is closed (all trades that participate in the cycle can take place).

Figure 15:
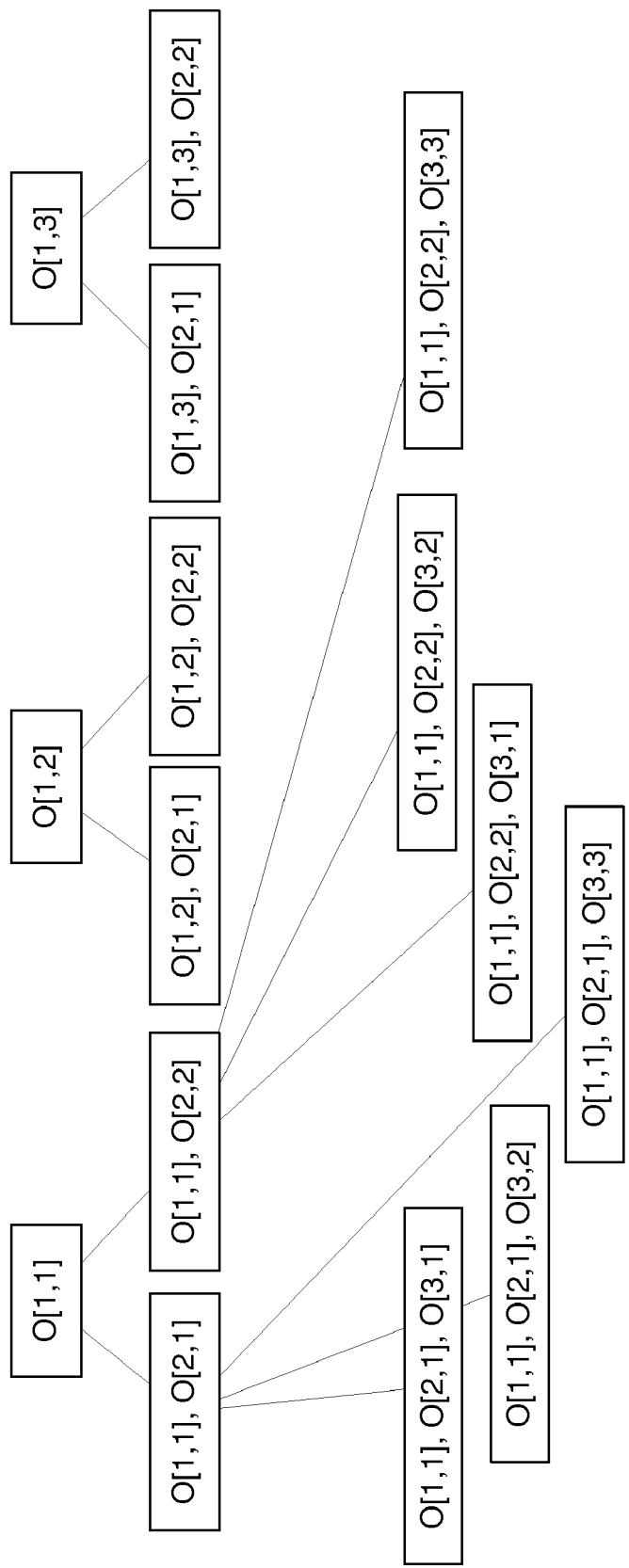
FIG. 15 shows a schematic tree diagram formed by an algorithm that may be used for NDES implementation.

The set of all possible cycles TC may be represented as a tree in which the leaves are combinations of options from all traders. This concept is illustrated in FIG. 15, which shows a tree describing a scenario of 3 traders, each having 2 options. For purposes of clarity, only the subtree with O[1, 1] as the root is shown in its entirety, and subtrees with O[1, 2] and O[1, 3] as the roots are only partially shown. As shown in FIG. 15, the tree has the options of Trader 1 at its root, and a new trader is added at each level. The leaves of the tree represent distinct combinations of options from all vendors. While the depth of the tree (and the length of each branch) may be equal to the total number of traders, it need not be because traders may have different numbers of options.

Each node in this tree represents a trade cycle $TC_k$ in which the items exchanged are all items that belong to the groups that belong to the options that are part of that node. At each such cycle $TC_k$, zero or more items "change hands" from one trader to the other. A cycle $TC_k$ may be defined as closed if all items that are part of that cycle have been traded. Note that each branch of the tree may contain more than one closed cycle, and some branches may contain no closed cycles. The goal of the algorithm is to explore all branches in an efficient manner and identify the longest closed cycle. Good closed cycles are thus towards the bottom of the tree, and ideal cycles are at the leaves of the tree, where all traders involved get to exchange their items.

In an example implementation of this algorithm, the tree is traversed recursively (an iterative version is also possible) and at each step, items are shuffled between the four sets PK, PB, PA, and PT. A closed cycle is found when both PA and PB are empty. A recursive version is as follows:

1. Initialize PK with all items from P.
2. Initialize two variables j and i to 1. These variables will be used in the recursive call to iterate through all traders and all options of each trader, respectively.
3. Start with trader i.
4. Identify O[i] and start with O[i, j], option j of trader i.
5. Identify the two groups $G_W[i, j]$ and $G_O[i, j]$.
6. Identify the items belonging to $G_W[i, j]$ and store them in a temporary set $PW_{temp}$.
7. Identify any items from $PW_{temp}$ that exist in PA. If any are found, remove them both from $PW_{temp}$ and PA and place them into PT.
8. Identify any items remaining in $PW_{temp}$ that exist in PK and place them in PB, removing them from $PW_{temp}$ and PK; note that at this point trader T[i] is "satisfied" (the items he desires have been allocated to him).
9. Identify all items from $G_O[i, j]$ and place them in a temporary set $PW_{temp}$.
10. Identify all items from $PO_{temp}$ that exist in PB. Remove these items from PB and $PO_{temp}$ and place them into TP.
11. Identify any remaining items from $PO_{temp}$ that exist in PK. Remove those items from PK and $PO_{temp}$ and place them into PA.
12. If both PA and PB are now empty, we have just closed a cycle (all items are being traded). Record the current cycle, $TC_k$, as a possible candidate.
13. If both $PW_{temp}$ and $PO_{temp}$ are now empty, go back to step 3 and initiate another recursion for the next trader, i+1.
14. If either $PW_{temp}$ or $PO_{temp}$ is not empty, a dead end has been reached and the NDES is unable to trade all items. Go back to step 4 and initiate another recursion with option O[i, j+1].
15. Repeat the steps above until the end of the list of traders has been reached.

At the end of this recursive process, there will be a set of closed cycles $TC_1, TC_2, \ldots, TC_n$. The cycle with the largest number of trades will then be selected from among these closed cycles. The number of trades is equal to the number of items from the set O (trade options) that have participated in the algorithm. Note that any of the cycles may be selected, but the one with the most trades will satisfy the largest number of traders and generate the largest revenue for the system. Also note that the condition for identifying a closed cycle is that both PA and PB are empty and PT is not empty.

Figure 16A:
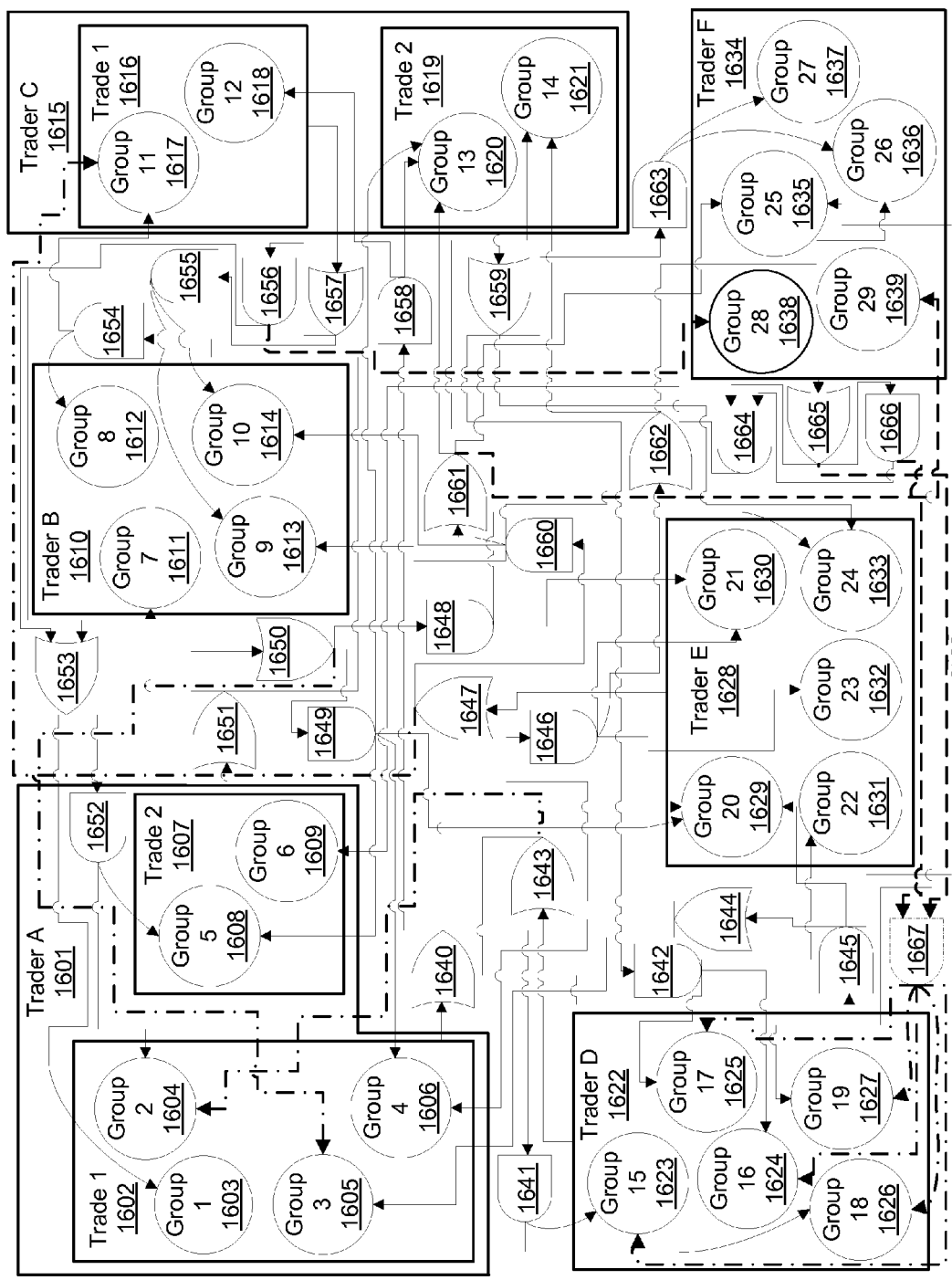
FIG. 16A shows a block diagram that schematically illustrates a possible trading scenario in the NDES.

FIG. 16 shows a block diagram illustrating another example of a possible trading scenario that may exist in an NDES. Six traders participate in the following trading scenario. Trader F 1634 represents the NDES itself functioning as a trader. Traders A 1601 and C 1615 have entered two separate trades in the NDES. Every trade of every trader consists of several groups of items, where a group may consist of a single item or a plurality of items. Also, in FIG. 16, trading options are represented by solid lines and defined by each trader through the combinations of "AND" and "OR" gates. These trading options represent the exchanges that each trader has defined in order to receive the items that they want. The dashed lines in FIG. 16 represent the trades suggested by the NDES through trader 1634 to various traders.

In the trading scenarios shown in FIG. 16 and FIGS. 17 through 20, trader F 1634 has Group 29 1639, which may represent cash possessed by the NDES. This group is not available to be selected as a wanted item by other traders because it is a variable amount of cash that is designated by the NDES to be used only to close open chains. Thus the NDES may suggest that a trader receive a certain amount of cash from Group 29 1636 as a substitute for an item that is not available to him or her.

FIG. 16B shows a table that illustrates in tabular form what groups each trader has, each of their trades, and what groups would they like to receive in return for each of their trades. The table also includes the suggested groups, which are denoted by the word "Suggest" in the table.

Figure 17:
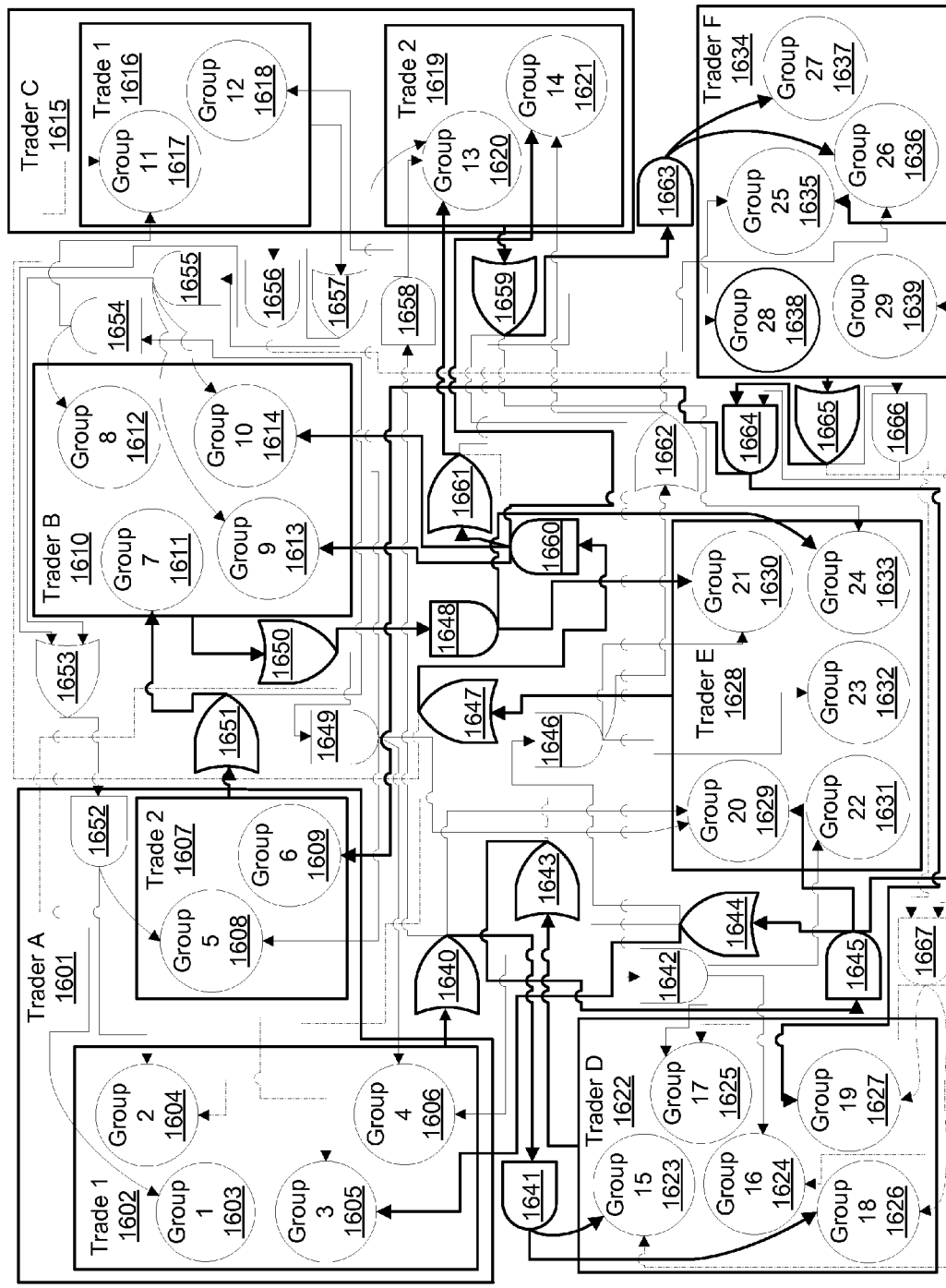
FIG. 17 shows a block diagram that schematically illustrates a possible resolution of the trading scenario shown in FIG. 16A.

One of the possible complete chains that may be found in the trading scenario shown in FIG. 16 is shown in FIG. 17, where the closed chain links in FIG. 17 are represented by bold solid lines. In this case, trader A, 1601 in exchange for his or her groups listed in trade 1 1602, receives Group 15 1623 and Group 18 1626 via OR gate 1640 and AND gate 1641, from trader D 1622. Trader D 1622, in exchange for his or her group listed in a single trade, via OR gate 1643 and AND gate 1645, receives Group 3 1605 from trade 1 1602 of trader A 1601 via OR gate 1644, Group 20 1629 from trader E 1628, and Group 25 1635 from trader F 1634 (NDES). Trader E 1628 in his or her turn receives via OR gate 1647 and AND gate 1660 Group 9 1613 and Group 10 1614 from Trader B 1610, and Group 13 1620 (via OR gate 1661) and Group 14 1621 from trade 2 1619 of trader C 1615. Then trader F 1634 (NDES) receives Group 19 1627 from trader D 1620 and Group 6 1609 from Trade 2 1607 of trader A 1601 via OR gate 1665 and AND gate 1664. In general, the NDES may be configured to exchange items in the warehouse primarily for groups that represent cash rather than other items and therefore may select groups that have cash from other traders as wanted groups.

The NDES is also capable of trading items from the warehouse for other items by recursively suggesting itself as an option to close the chain. In this case, Group 19 1627 and Group 6 1609 are directly defined as wanted by Trader F 1634 (NDES) and therefore can safely be assumed to consist of sums of cash in these groups. Trader C 1615 for his or her groups in trade 2 1619 receives Group 26 1636 and Group 27 1637 from trader F 1634 (NDES) via OR gate 1659 and AND gate 1663. Trader B 1610 receives Group 21 1630 and Group 24 1633 from trader E 1628 via OR gate 1650 and AND gate 1648. In his or her turn trader A 1601 in return for his or her trade 2 1607 receives Group 7 from trader B 1610 via OR gate 1651, thus closing the chain.

In the trading scenario illustrated in FIG. 17, some traders are able to trade all of their items and receive what they want in return, while others are able to trade only a portion of the items they have listed in their trades, but nonetheless still receive all of the items that they wanted in exchange. As an example, trader C 1615 is able to trade both items in his or her trade 2 1619. At the same time, trader C 1615 has defined three different trading options for trade 2 1619 in such a way that if any one of them would be executed, trader C 1615 would be amenable to exchange his or her groups. In FIG. 17, the third of the Trader C's 1615 three trading options is executed, allowing him or her to receive Group 26 1636 and Group 27 1637. The other traders are also able to obtain the items that they have indicated they wish to receive in one of their defined trading options. Unlike the situation with trade 2 1619 of trader C 1615, some of the other traders may not have to sacrifice all of the groups that they have included in their trades in order to receive the groups that they wish to receive, such as, for example, trader A 1601 as to trade 1 1602 and trade 2 1607. Thus this example illustrates that in certain cases, the NDES may be able to devise a trading scenario wherein traders may need to sacrifice less of his or her possessions than they initially indicated in order to receive the groups that they wanted.

Figure 18:
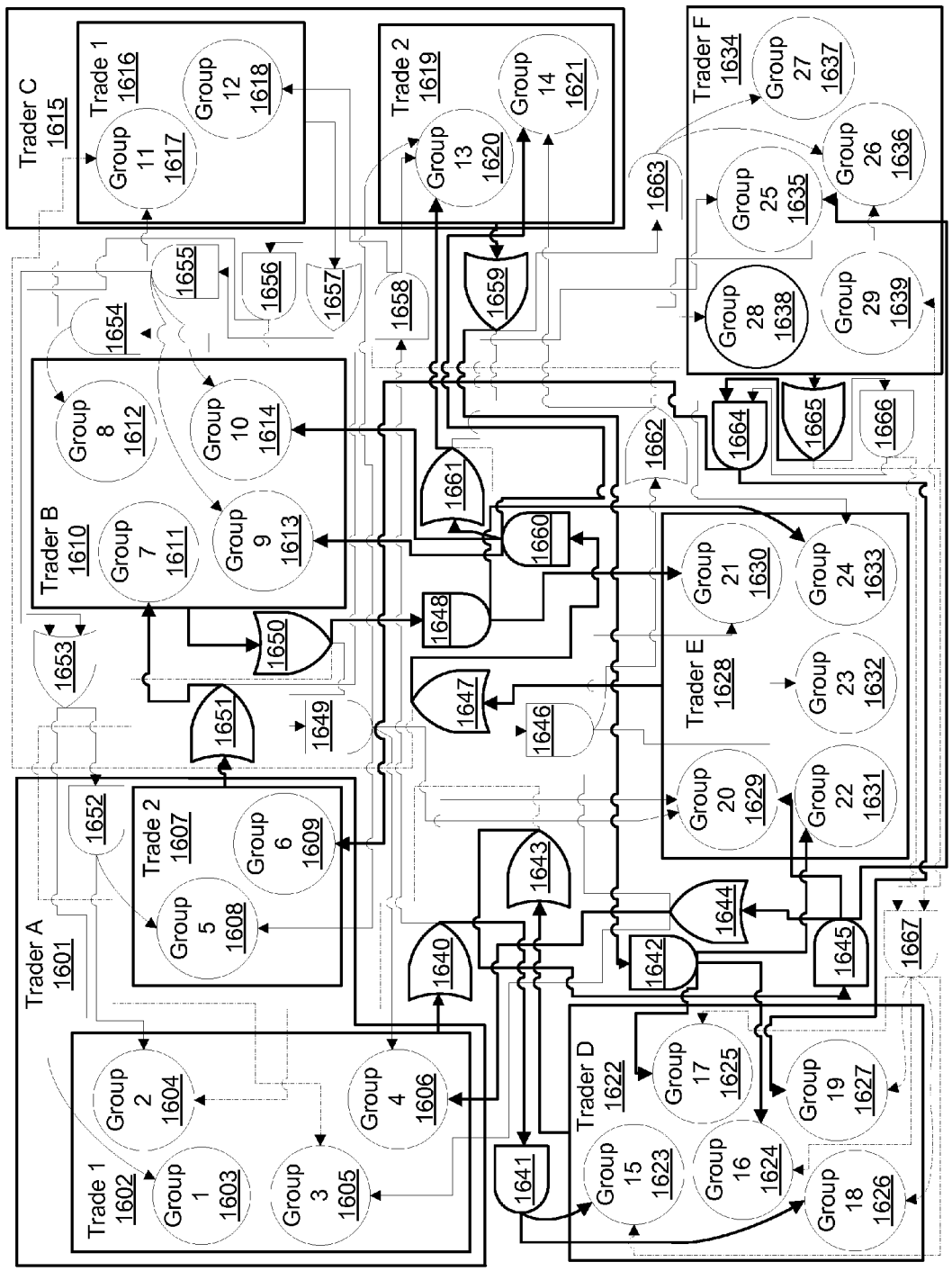
FIG. 18 shows a block diagram that schematically illustrates another resolution of the trading scenario shown in FIG. 16A.

Another possible closed chain from the trading scenario in FIG. 16 is shown in FIG. 18. Similarly to FIG. 17, the chain links in FIG. 18 that form a closed chain are represented by bold solid lines. In this trading scenario, trader A 1601 in exchange for his or her groups listed in trade 1 1602 receives Group 15 1623 and Group 18 1626 from trader D 1622 via OR gate 1640 and AND gate 1641. Trader D 1622 in his or her turn receives, via OR gate 1643 and AND gate 1645, Group 4 1606 from trade 1 1602 of trader A 1601 via OR gate 1644, and Group 20 1629 from trader E 1628 and Group 25 1635 from trader F 1634 (NDES). Trader E 1628 then receives, via OR gate 1647 and AND gate 1660, Group 9 1613 and Group 10 1614 from trader B 1610, and Group 13 1620 via OR gate 1661 and Group 14 1621 from trade 2 1619 of trader C 1615. Trader F 1634 (NDES) receives Group 6 1609 from trade 2 1607 of trader A 1601 and Group 19 1627 from trader D 1622 via OR gate 1665 and AND gate 1664.

According to the description of FIG. 17, Group 6 1609 and Group 19 1627 wanted by Trader F 1634 consist entirely of certain sums of cash. Trader B 1610 in his or her turn receives Group 21 1630 and Group 24 1633 from trader E 1628 via OR gate 1650 and AND gate 1648. Trader C 1615 for his or her trade 2 1619 gets Group 16 1624 and Group 17 1625 from Trader D 1622 and Group 22 1631 from Trader E 1628 via OR gate 1659 and AND gate 1642. Trader A 1601 receives Group 7 1611 from trader B 1610 for his or her Trade 2 1607, thereby closing the chain and enabling all traders to exchange their items and receive the items they all wanted.

Figure 19:
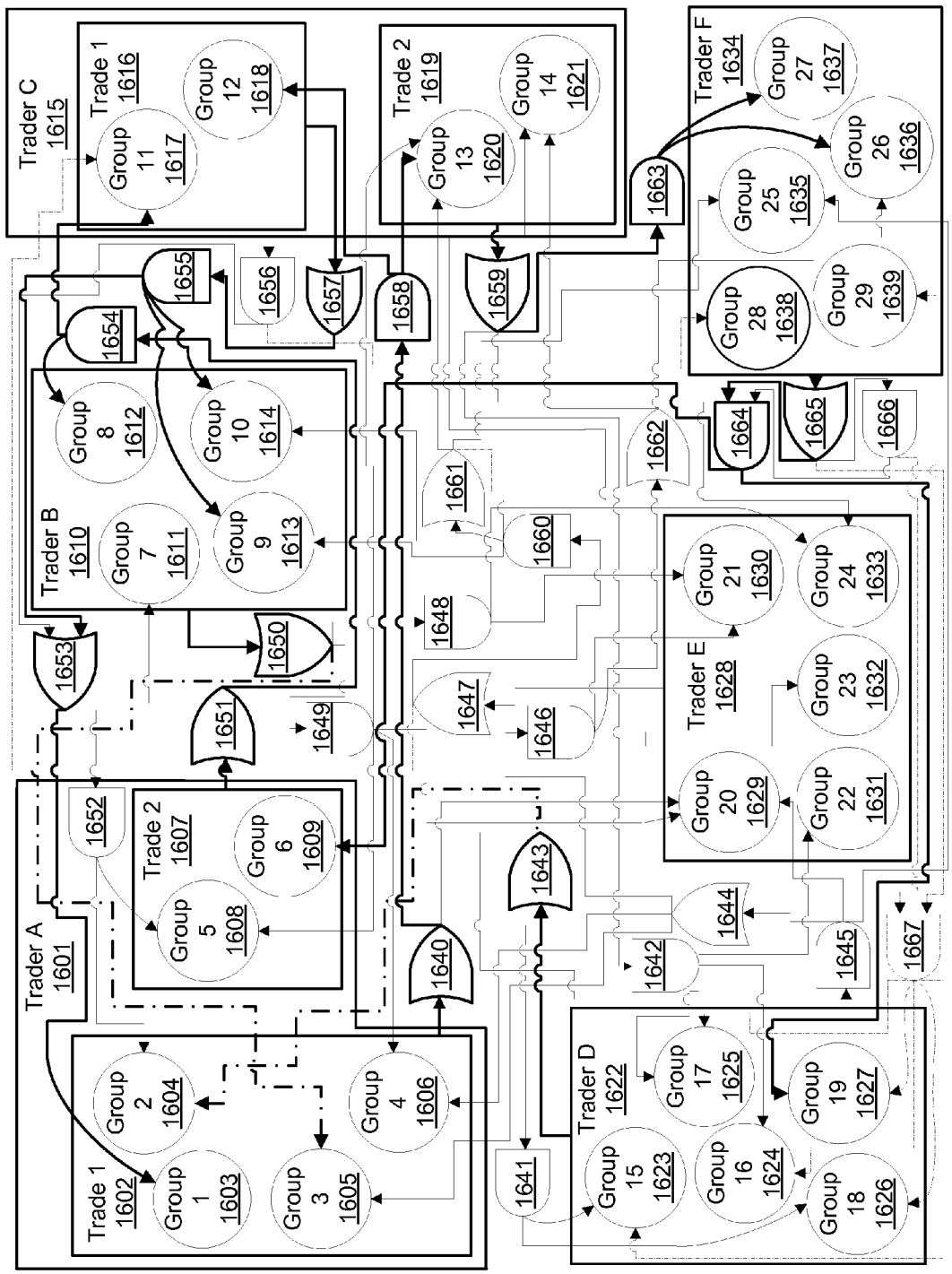
FIG. 19 shows a block diagram that schematically illustrates yet another resolution of the trading scenario shown in FIG. 16A.

A third possible closed chain from scenario in FIG. 16 is shown in FIG. 19. This closed chain is slightly different from the previous two closed chains discussed above because it includes suggestions represented by bold dotted-dashed lines provided by the NDES to the traders as options to receive alternative items than they originally selected from other traders. In this particular trading scenario, trader A 1601 receives Group 12 1618 from trade 1 1616 of trader C 1615 and Group 13 1620 from trade 2 1619 of trader C 1615 in exchange of his or her own trade 1 1602 via OR gate 1640 and AND gate 1658. Trader C 1615 then for his or her Trade 1 1616, via OR gate 1657 and AND gate 1655, receives Group 9 1613 and Group 10 1614 from trader B 1610 and Group 1 1603 from trade 1 1602 of trader A 1601 via OR gate 1653. Trader C 1615 also for his or her trade 2 1619 receives Group 26 1636 and Group 27 1637 from trader F 1634 (NDES) via OR gate 1659 and AND gate 1663. Trader F 1634 (NDES) then receives Group 19 1627 from trader D 1622 and Group 61609 from trade 2 1607 of Trader A 1601 via OR gate 1665 and AND gate 1664.

According to the description of the FIG. 17, Group 6 1609 and Group 19 wanted by the Trader F 1634 consist entirely of certain sums of cash. Then trader A 1601 receives Group 8 1612 from trader B 1610 and Group 11 1617 from trade 1 1616 of trader C 1615 via OR gate 1651 and AND gate 1654 in exchange for his or her trade 2 1607. In this case, there are two open chain links because trader D 1622 and trader B 1610 are not able to receive anything that they wanted. The suggestion module of the NDES tries to resolve these types of situations by suggesting alternative items in order to close the chain. In this particular scenario, the NDES suggests that trader B 1610 receive Group 3 1605 from trade 1 1602 of trader A 1601 via OR gate 1650 because this particular item fit the suggestion guidelines defined by trader B 1610. By accepting this suggestion, trader B 1610 creates a chain link represented by the bold dashed-dotted line and therefore leaving only one chain link open. Then the NDES, according to the suggestion guidelines previously defined by trader D 1622, suggests to him or her Group 2 1604 from trade 1 1602 of trader A 1601 via OR gate 1643. By accepting this suggestion, trader D 1622 creates the last chain link that allows the closing of the open chain.

Figure 20:
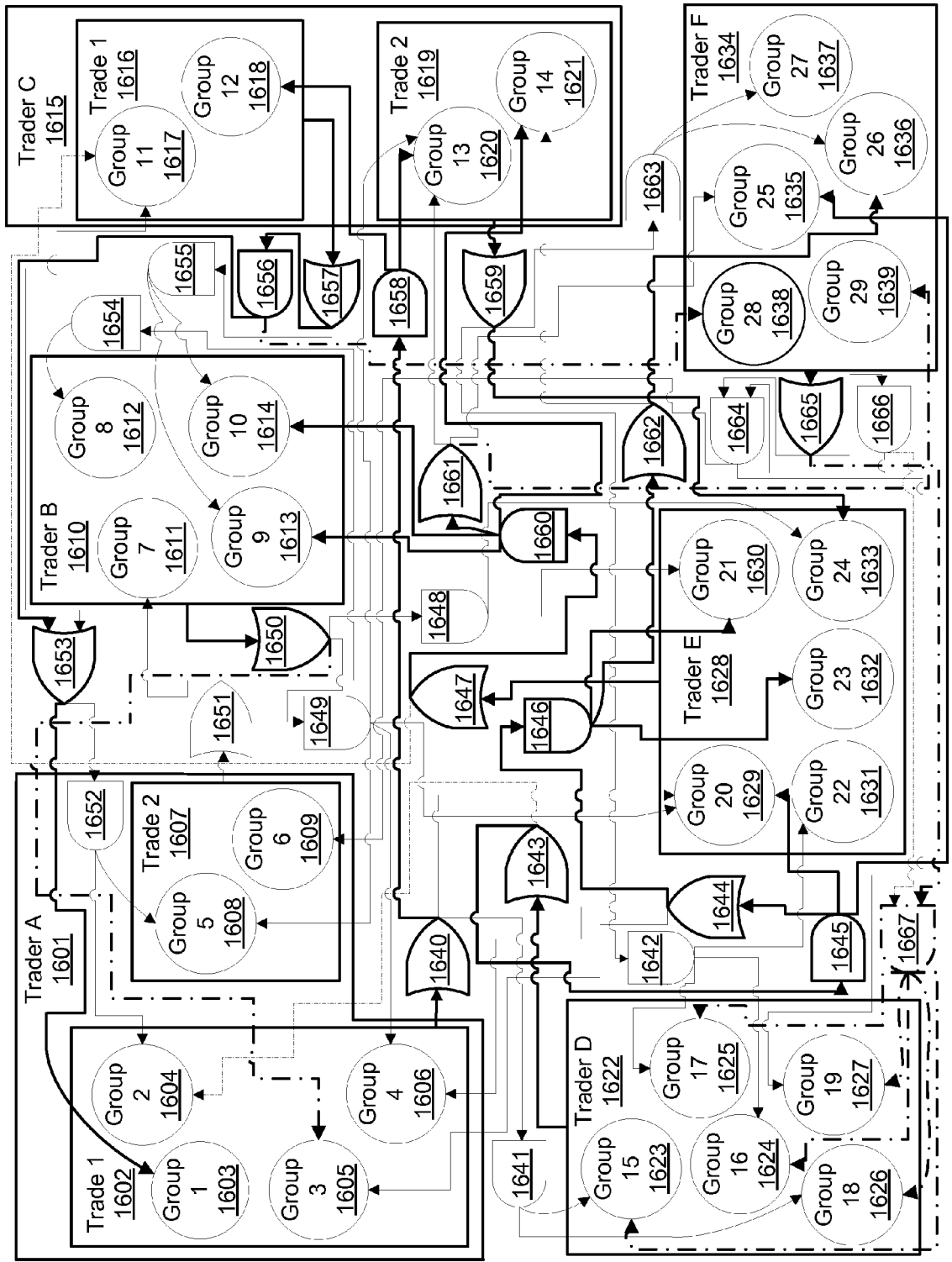
FIG. 20. shows a block diagram that schematically illustrates yet one more resolution of the trading scenario shown in FIG. 16A.

Another possible closed chain from the trading scenario shown in FIG. 16 is shown in FIG. 20. This closed chain is similar to the trading scenario shown in FIG. 19, but in addition to providing traders with suggestions to receive alternative items from one another, it also includes suggestions to receive items from the NDES and includes suggestions to the NDES to receive items in exchange for the items from the warehouse instead of cash in order to close open chains.

Trader A 1601 in FIG. 20 receives Group 12 1618 from trade 1 1616 of trader C 1615 and Group 13 1620 from trade 2 1619 of trader C 1615 in exchange for his or her trade 1 1602 via OR gate 1640 and AND gate 1658. Then trader C 1615 receives Group 1 1603 from trade 1 1602 of trader A 1601 via OR gate 1657, AND gate 1656, and OR gate 1653, and instead of Groups 9 1616 and 10 1614 he or she listed as wanted, trader C 1615 receives a suggestion to receive Group 28 1638 from trader F 1634 (NDES) via AND gate 1656. In this case, the NDES suggests that trader C 1615 receive an actual group of items from the warehouse. Then in exchange for his or her trade 2 1619, trader C 1615 receives Group 24 1633 from trader E 1628 via OR gate 1659. Trader E 1628 in his or her turn receives Group 9 1613 and Group 10 1614 from trader B 1610 and Group 14 1621 from trade 2 1619 of trader C 1615 via OR gate 1647 and AND gate 1660, and instead of Group 13 1620, he or she receives a suggestion to receive Group 29 1639 from trader F 1634 (NDES), which in this case is a certain amount of cash. Trader B 1610 in exchange for his or her items receives a suggestion from the NDES that he or she receive Group 3 1605 from trade 1 1602 of trader A 1601 via AND gate 1650. Trader D 1622 then receives Group 20 from trader E and Group 25 from trader F 1634 (NDES) via OR gate 1643 and AND gate 1645 and Group 21 and Group 23 from trader E 1628 via OR gate 1644 and AND gate 1646.

While trader F 1634 would like to receive Group 6 1609 and Group 19 1627, this trade cannot be executed because trade 2 1607 of trader A 1601 did not participate in any of the trades. In this case, the NDES, i.e., trader F 1634, suggests that it receive Group 15 1623, Group 16 1624, Group 17 1625, Group 18 1626, and Group 19 1627 from trader D 1622 in order to close the open chain. By calculating the value of the groups that will be received and the profit gained by executing this trade chain, the NDES may determine to accept those suggestions if the profit and value of acquired assets is larger than the expenses incurred by trading items from the warehouse. By accepting these suggestions, trader F 1634 (NDES) closes the open chain allowing all the trades to be executed.

In all four scenarios described above and shown in FIGS. 17 through 20, the NDES is essentially impersonating a user in one way or another. In FIGS. 17 through 19, the NDES acts as a regular trader trying to trade away the inventory in the warehouse for certain amounts of cash. In FIG. 20, besides acting as a regular trader, the NDES is impersonating a user in a way that suggests that the users at one open end of a chain receive alternative groups from the NDES instead of the groups that cannot be delivered to those users, and then suggests itself as the receiver of certain groups from the traders at the other end of open chain. In this case, the NDES inserts itself as the last user in the chain in order to close the open chain.

While the NDES is capable of deriving these four trading scenarios in this particular example, only one of them will eventually be executed. In choosing which one to execute, the NDES may select a trading scenario to execute depending on the number of transactions in that trading scenario. Out of these four trading scenarios described above, the NDES may choose to execute the trading scenario shown in FIG. 20 because it has twenty transactions involved in the scenario. The other three scenarios have fewer transactions per scenario and therefore may be less profitable than the trading scenario shown in FIG. 20.

Even though the trading scenario shown in FIG. 20 has the most transactions in that particular example, it may not necessarily be the most profitable over all solution in the NDES. The NDES is capable of deriving all permutations of closed chains. Thus there may be many solutions for any particular trading situation. There may be many small closed chains, one large closed chain, or possibly a few average-size closed chains. The largest closed chain in this case might not be the most profitable solution because the sum of the possible transactions among all the available small closed chains may be larger than the amount of transactions in the one large closed chain.

A block diagram illustrating a trading scenario with several permutations of closed chains is shown in FIG. 21. In this particular case, the NDES determined three over-all solutions for the existing trading situation in the NDES. The circles shown in each chain and connected with lines represent the transactions between the users in the chain. Solution 1 2102 shows four small chains, chain A 2104, chain B 2106, chain C 2108, and chain D 2110. Solution 2 2112 consists of three chains, two small chains, chain E 2114 and chain F 2116, and one very large chain, chain G 2118. Solution 3 2120 has three average sized chains, chain H 2122, chain I 2124, and chain J 2126. These three solutions are all of the possible over-all system solutions in this example, and only one of them may be executed because by definition, each of these solutions contain all possible closed chains and it is not possible to create any more closed chains in that particular solution.

Depending on any predefined criteria, the NDES may select and execute any of these solutions. In order to maximize profitability, solution 3 2120 may be selected. Although it does not have as many closed chains (4) as solution 1 2102 and does not have an extremely large closed chain as does solution 2 2112, the sum of the transactions in solution 3 2120 is much larger than the sum of transactions in either solution 1 2102 or solution 2 2112.

The processes described in FIG. 1 through FIG. 4 may be performed by hardware or software. If the process is performed by software, the software may reside in software memory (not shown) in the controller, memory, or a removable memory medium. The software in memory may include an ordered listing of executable instructions for implementing logical functions (i.e., "logic" that may be implemented either in digital form such as digital circuitry or source code or in analog form such as analog circuitry or an analog source such an analog electrical, sound or video signal), may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, or device. More specific examples, i.e., "a non-exhaustive list" of the computer-readable media, would include the following: an electrical connection "electronic" having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In general, the system described provides for the exchange of goods and services, directly and indirectly, between multiple users over a network. As the system receives information from its users related to the goods and services (sometimes referred to as "items") that are offered for exchange and also desired in exchange, the system determines all possible trades that may be completed and selects those trades, based on predetermined parameters input into the system, that will optimize the transactions.

Also the system described may have an option to trade items of the same category exclusively only for the items of that category. Creating separate trade rooms for different item categories would give users more flexibility by allowing them to exchange their items for the same kind, but different item. This type of option may be particularly useful for DVD, CD, or video game exchanges.

The system may also, when choosing items for exchange or the cash equivalent value of an item, consider the costs of shipping the item(s) to other users as well as packing them in a manner suitable for safe shipping. The system may also provide tools that assist users in making determinations as to the cost of shipping items.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A computer-implemented method of exchanging items over a network comprising a server and a plurality of computers between a plurality of users, the method comprising:
   receiving information at the server from each of the plurality of users from their respective servers related to at least one item that each user is willing to exchange for other items held by other users of the plurality of users;
   providing each user with access to the information on the server related to the other items held by the other users;
   allowing each user to select from the information at least one item that each user is willing to accept in exchange for the at least one item each user is willing to exchange;
   creating a chain link for each item that is selected to be received in exchange by any of the users; and
   using a trading scenario algorithm to generate all possible permutations of closed chains of exchanges utilizing the chain links.

2. The method of claim 1, wherein each of the items includes at least one good, service, article, product, tangible, intangible, or commodity, or any combination thereof.

3. The method of claim 2, wherein the step of generating a closed chain of exchanges further includes
   selecting an optimal permutation from the all possible permutations of closed chains based on predetermined criteria.

4. The method of claim 3, wherein the optimal permutation is selected by reason of its having a maximum number of chain links included therein.

5. The method of claim 3, further including the step of notifying each of the users included in the optimal permutation of the items that each of the users will receive in exchange for the items each of the respective users has offered for exchange.

6. The method of claim 2, where the step of generating the closed chains of exchanges further includes utilizing a fictitious trader that is capable of participating in one or more exchanges with the users in order to close at least one chain of exchanges.

7. The method of claim 6, wherein the step of utilizing the fictitious trader further includes:
   enabling the fictitious trader to select one or more of the items offered for exchange by any of the users; and
   creating a chain link for each of the selected one or more items.

8. The method of claim 7, wherein the step of utilizing the fictitious trader further includes enabling the fictitious trader to contribute cash in exchange for items for exchange.

9. The method of claim 7, where the step of using the fictitious trader further includes providing the fictitious trader with a warehouse containing preselected items available for exchange with the other users.

10. The method of claim 2, further including the steps of:
    receiving information from additional users related to at least one item that each additional user wishes to exchange for other items;
    storing the information received from each additional user in memory;
    providing each additional user with access to the information in the memory related to the items offered for exchange; and
    allowing each additional user to select from the information provided those items the additional user is willing to accept in exchange for the items the additional user wishes to exchange.

11. The method of claim 10, further including the step of repeating the steps of claims 4 and 6.

12. The method of claim 2, further including the step of storing the information received from each of the plurality of users in memory.

13. The method of claim 12, where the step of storing the information in the memory includes assigning a category to each item that is stored in the memory.

14. The method of claim 13, where the step of providing the user with access to the information in the memory includes allowing the user to search or to browse the memory.

15. A normalized distributed exchange system ("NDES"), whereby a plurality of users may each exchange one or more items with other users of the plurality of users over a distributed network comprising a server and a plurality of computers, the NDES comprising:
    a user interface module on the server in signal communication with each of the plurality of users, whereby the user interface module is configured to receive data from each user related to at least one item each user is willing to exchange for one or more other items offered for exchange by other users of the NDES; and
    a chain seeker module in signal communication with the user interface module, wherein the chain seeker module is configured to receive the data from the user interface module related to the items offered for exchange and from that data, create a chain link for each item that is selected to be received in exchange by any of the users, and generate all possible permutations of closed chains of exchanges that utilize a plurality of the created chain links.

16. The NDES of claim 15, where each of the items includes at least one good, service, article, product, tangible, intangible, or commodity, or any combination thereof.

17. The NDES of claim 16, further including a trading option module in signal communication with the user interface module configured to generate trading options for each of the users responsive to data provided by the users through the user interface module.

18. The NDES of claim 17, further including a memory in signal communication with the user interface module and the trading option module, whereby the information from the users related to the items is stored in the memory.

19. The NDES of claim 18, further including a suggestion module in signal communication with the chain seeker module, the user interface module, and the memory, wherein the suggestion module is configured to retrieve information from the memory and provide selected information to one or more users via the user interface module.

20. The NDES of claim 16, wherein the chain seeker module is configured to utilize a fictitious user to create one or more additional chain links in order to close at least one open chain of exchanges.

21. The NDES of claim 20, wherein the fictitious user is generated by the NDES that is capable of participating in one or more exchanges with the one or more users in order to close at least one chain of exchanges.

22. The NDES of claim 20, wherein the chain seeker module is further configured to utilize cash contributed by the fictitious user in order to close a chain of exchanges.

23. The NDES of claim 20, further including a warehouse adapted to store items used for exchanges involving the fictitious user.

24. The NDES of claim 16, wherein the chain seeker module is configured to generate a plurality of permutations of closed chains of exchanges utilizing all of the created chain links.

25. The NDES of claim 24, wherein the chain seeker module is further configured to select, according to predetermined criteria, at least one of the plurality of permutations generated by the chain seeker module.

26. An exchange system whereby each of a plurality of users of the exchange system may exchange one or more items with other users of the plurality of users over a network, the exchange system comprising:
   means for receiving information related to items offered for exchange by each of the plurality of users;
   means for providing access to the received information to the users of the exchange system;
   means for allowing the users to select items contained in the received information to be received in exchange for items available to the respective users; and
   means for determining an optimal number of exchanges that may be consummated between the plurality of users who have selected items for exchange.

27. The exchange system of claim 26, wherein the determining means further includes:
   means for creating chain links in response to the selection of items by the users; and
   means for generating at least one closed chain of exchanges utilizing the chain links.

28. The exchange system of claim 27, wherein the generating means further includes:
   means for generating all possible permutations of closed chains of exchanges utilizing the chain links; and
   means for selecting an optimal permutation from the all possible permutations of closed chains based on predetermined criteria.

29. The exchange system of claim 28, wherein the predetermined criteria includes a maximum number of exchanges included in the optional permutation.

30. The exchange system of claim 28, further including:
   means for creating a fictitious trader;
   means for enabling the fictitious trader to select one or more of the items offered for exchange by any of the users and creating a chain link for each of the selected one or more items; and
   means for enabling the fictitious trader to participate in one or more exchanges with the users in order to close at least one chain of exchanges.

31. A non-transitory computer-readable medium having software for establishing a normalized distributed exchange system ("NDES"), the computer-readable medium comprising:
   logic configured for receiving information from each of a plurality of users using the NDES related to at least one item that each of the plurality of users is willing to exchange for other items held by other users on the NDES;
   logic configured for providing each user with access to the received information related to the other items held by the other users on the NDES;
   logic configured for allowing each user to select from the received information at least one item that each user is willing to accept in exchange for the at least one item each user is willing to exchange;
   logic configured for creating a chain link for each item that is selected to be received in exchange by any of the users; and
   logic configured for using a trading scenario algorithm to generate all possible permutations of closed chains of exchanges utilizing the chain links.

32. The computer-readable medium of claim 31, further including logic configured for selecting an optimal closed chain of exchanges from the permutations of closed chains based on predetermined criteria.

33. The computer-readable medium of claim 32, further including logic configured for determining the closed chain of exchanges having the maximum number of chain links including therein.

34. The computer-readable medium of claim 33, further including logic configured for utilizing a fictitious trader generated by the NDES that is capable of participating in one or more exchanges with the users in order to close at least one chain of exchanges.

35. The computer-readable medium of claim 33, wherein the logic configured for providing each user with access to the received information further includes logic configured to retrieve information from a memory and to provide additional selected information related to items available for exchange to the users related to any unclosed chains of exchange.

36. The computer-readable medium of claim 35, further including logic configured for receiving selections from the users receiving the additional selected information and closing one or more of the unclosed chains of exchanges responsive to the received selections.

* * * * *